United States Patent [19]

Gorham et al.

[11] 4,113,991
[45] Sep. 12, 1978

[54] AUTOMATIC DIALER HAVING A SELECTIVE RETRY CAPABILITY

[75] Inventors: Michael L. Gorham, Plano, Tex.; Roger F. Norian, Norwalk, Conn.

[73] Assignee: Xerox Corporation, Stamford, Conn.

[21] Appl. No.: 793,454

[22] Filed: May 3, 1977

[51] Int. Cl.² .................. H04M 1/42; H04L 11/15
[52] U.S. Cl. .................. 179/90 B; 358/257; 358/280
[58] Field of Search .......... 179/90 B, 90 BB, 90 BD, 179/90 CS; 358/256, 257, 280

[56] References Cited

U.S. PATENT DOCUMENTS

| 3,751,583 | 8/1973 | Lemelson | 358/257 |
| 3,792,203 | 2/1974 | Martin | 179/90 B |
| 3,885,108 | 5/1975 | Zock | 179/90 B |

Primary Examiner—Kathleen H. Claffy
Assistant Examiner—Gerald L. Brigance

[57] ABSTRACT

An automatic telephone dialer for placing outgoing telephone calls from a facsimile terminal or the like in response to dialing instructions read by a raster input scanner automatically re-attempts to place calls which cannot initially be completed because of a busy link status for a predetermined number of times. The dialer also includes means for at least temporarily suspending further operation of the scanner pending successful placement of the call.

5 Claims, 20 Drawing Figures

000
AUTOMATIC DIALER HAVING A SELECTIVE RETRY CAPABILITY

BACKGROUND OF THE INVENTION

This invention relates to methods and means for utilizing raster input scanners as readers for automatic telephone dialing equipment and, more particularly, to automatic telephone dialing methods and means for facsimile systems and the like.

Facsimile systems have gained widespread commercial acceptance because they offer rapid and accurate, long distance communication of most any type of graphic information (e.g., handwritten and printed pages, charts, graphs, and drawings), subject to minor exceptions which are principally attributable to resolution limitations. As is known, a basic facsimile system comprises a transmitting terminal and a receiving terminal which are interconnected by a communications link. Customarily, there is a raster input scanner within the transmitting terminal for serially converting or remapping the two dimensional information content of an original document (generally called a "subject copy") into a corresponding, one dimensional video signal. Moreover, the transmitting terminal normally includes a modulator for modulating a suitable carrier signal in accordance with the video signal so that a passband signal is provided for transmission to the receiving terminal via the communications link. Accordingly, the receiving terminal typically has a demodulator for recovering the video signal and a raster output scanner for serially printing a more or less exact replica or "facsimile" of the subject copy in response to the video signal.

Dedicated transmitters and receivers are sometimes used as terminals for facsimile systems, but the more common practice is to employ transceivers which are selectively operable in a transmit mode or a receive mode. As a general rule, the communications link or channel for facsimile communications is furnished on demand by a telephone dial system, such as the public switched telephone network.

Substantial effort and expense have been devoted to automating facsimile systems, thereby reducing the amount of operator intervention and supervision required. For example, the Xerox 200 Telecopier transceiver, which is manufactured and sold by Xerox Corporation, operates essentially automatically, with the notable exception of being able to place outgoing calls. Specifically, that unit automatically answers incoming calls and automatically disconnects incoming and outgoing calls. It can be automatically set in response to remotely generated commands to operate in a transmit mode or a receive mode at any one of its available document transmission rates of two, three, four and six minutes/page. Furthermore, the 200 transceiver includes an automatic document feeder which permits it to sequentially scan a plurality of subject copies automatically when operating in a transmit mode. Additionally, there is a roll fed paper supply which permits that unit to automatically print successive facsimile copies when operating in a receive mode. For a more detailed description of that transceiver, reference may be made to Mason et al. U.S. Pat. No. 3,869,569, which issued Mar. 4, 1975 on a "Facsimile Transceiving Apparatus," and to Perreault et al. U.S. Pat. No. 3,889,057, which issued June 10, 1975 on a "Facsimile Communication System." Hence, those patents are hereby incorporated by reference.

General purpose automatic telephone dialers have been available for several years. Nevertheless, few, if any, facsimile terminals have been equipped with automatic telephone dialing equipment prior to this invention.

SUMMARY OF THE INVENTION

Against the foregoing background, a general aim of the present invention is to provide methods and means for utilizing raster input scanners as readers for automatic telephone dialers. A more detailed, related object is to provide methods and means for translating raster scanned address indicia into the dial pulses or frequencies necessary to place outgoing telephone calls.

More particularly, an object of this invention is to provide economical methods and means for automatically placing outgoing telephone calls from unattended facsimile terminals. In more detail, an object is to provide methods and means for utilizing the raster input scanners of conventional facsimile transmitters and transceivers as readers for automatic telephone dialing equipment.

Even more pointedly, an object of the present invention is to provide methods and means for automatically placing outgoing telephone calls from unattended facsimile terminals at any preselected time of day, whereby those terminals can carry out facsimile communications at the most convenient time of day, such as during non-business hours when telephone traffic and charges are usually relatively low.

Another specific object of the present invention is to provide methods and means for automatically placing outgoing calls from unattended multi-speed facsimile terminals and for setting-up such terminals to operate in an individually preselected mode and at an individually preselected document transmission rate during each of those calls.

Still another object of this invention is to provide facsimile terminals with automatic dialing and control equipment of the foregoing type, without impairing the existing ability of those terminals to function under manual or remote control.

Briefly, to carry out these and other objects of the invention, a facsimile terminal is equipped with an automatic dialer which temporarily seizes control of the terminal when a unique recognition pattern at the leading edge of an address card is scanned. Each address card has a specially formatted instruction field which is divided into rows and columns to allow for the entry of mark sense indicia representing dialing and terminal control instructions. When a complete and unambiguous set of instructions are scanned, the dialer automatically makes a telephone call in accordance with the dialing and terminal control instructions. If the call cannot be completed or if the instructions are incomplete or unambiguous, the job is aborted and the terminal is returned to a standby state. If, on the other hand, the call is completed, communications are carried out in the usual way.

Preferably, the facsimile terminal has an automatic document feeder so that one or more address cards and, if appropriate, one or more sets of subject copies may be preloaded into the feeder to be scanned on command. That command may be entered as a simple start instruction or as a delayed start instruction. If a delayed start is used, scanning is initiated by the automatic dialer when the actual time of day comes into coincidence with a preselected time of day for the delayed start.

BRIEF DESCRIPTION OF THE DRAWINGS

Still further objects and advantages of the present invention will become apparent when the following detailed description is read in conjunction with the attached drawings, in which:

FIG. 8 is a diagram indicating the manner in which

FIGS. 9–16, when assembled as indicated in FIG. 8, combine to form a more detailed block diagram of the automatic dialer in combination with the exemplary transceiver.

DETAILED DESCRIPTION OF THE ILLUSTRATED EMBODIMENT

While the invention is described in some detail hereinbelow with specific reference to a single illustrated embodiment, it is to be understood that there is no intent to limit it to that embodiment. On the contrary, the aim is to cover all modifications, alternatives, and equivalents falling within the spirit and scope of the invention as defined by the appended claims.

A. A Synergistic Environment

Figure 1:
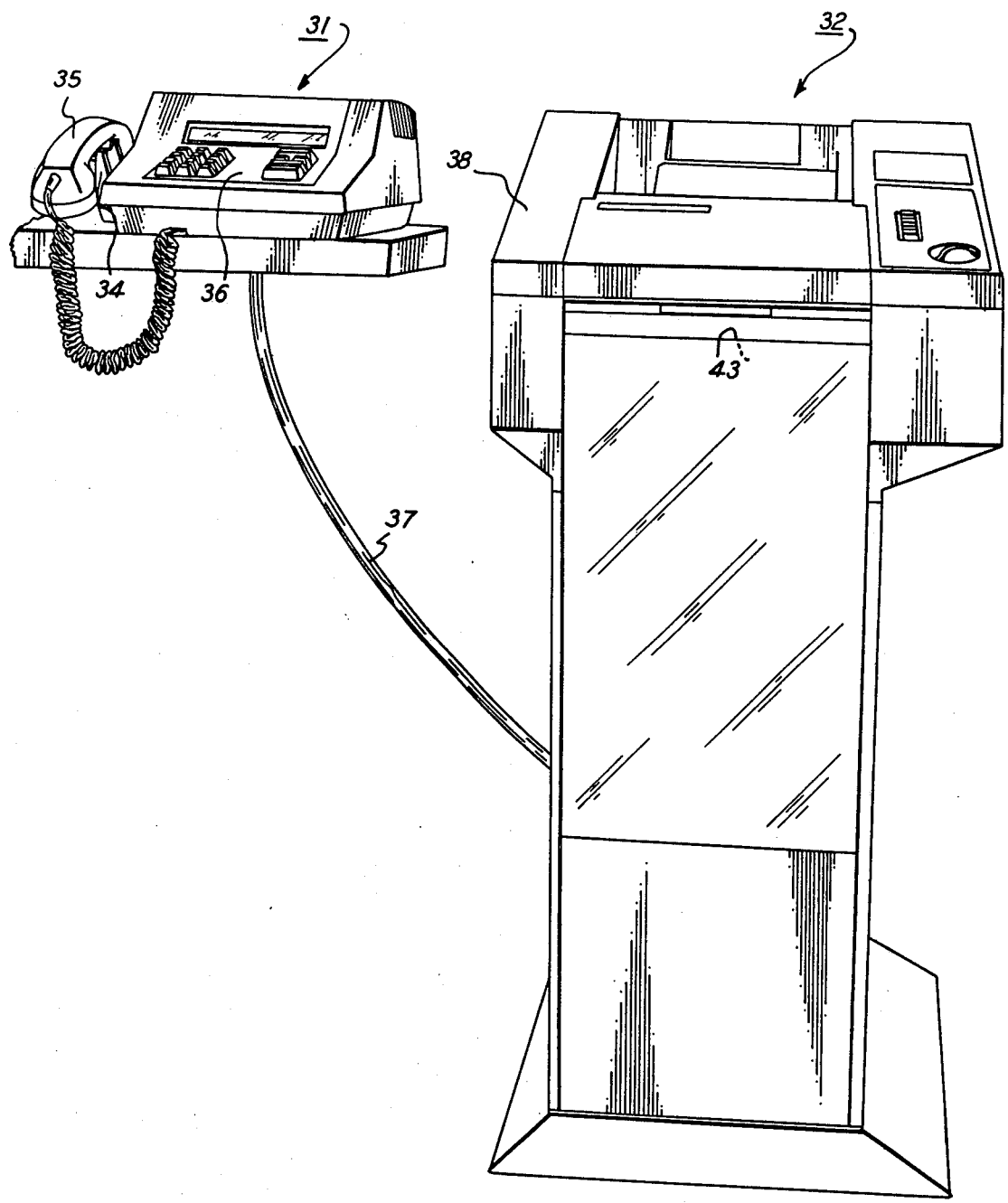
FIG. 1 is a simplified elevational view of a facsimile transceiver which is equipped with an automatic telephone dialer constructed in accordance with the present invention.
Figure 3:
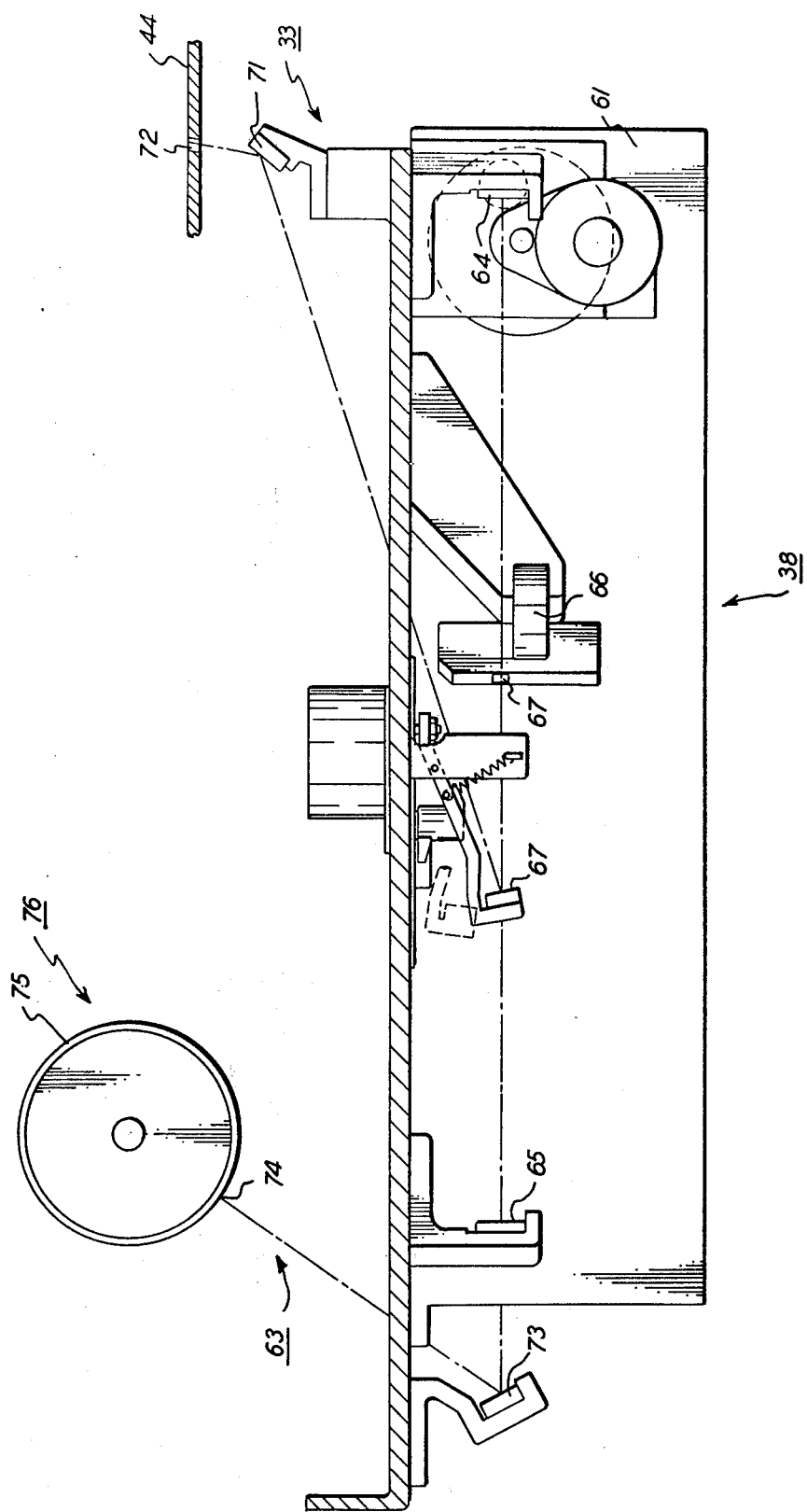
FIG. 3 is another partially sectioned and fragmentary elevational view illustrating the optics included within the exemplary transceiver shown in FIG. 1.
Figure 4A:
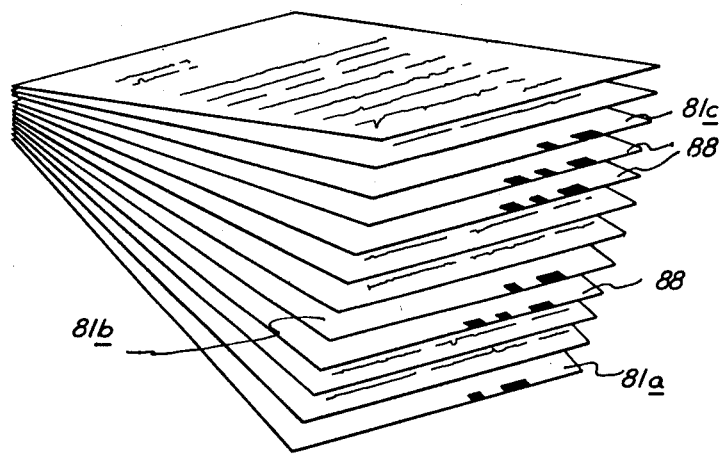
Figure 5B:
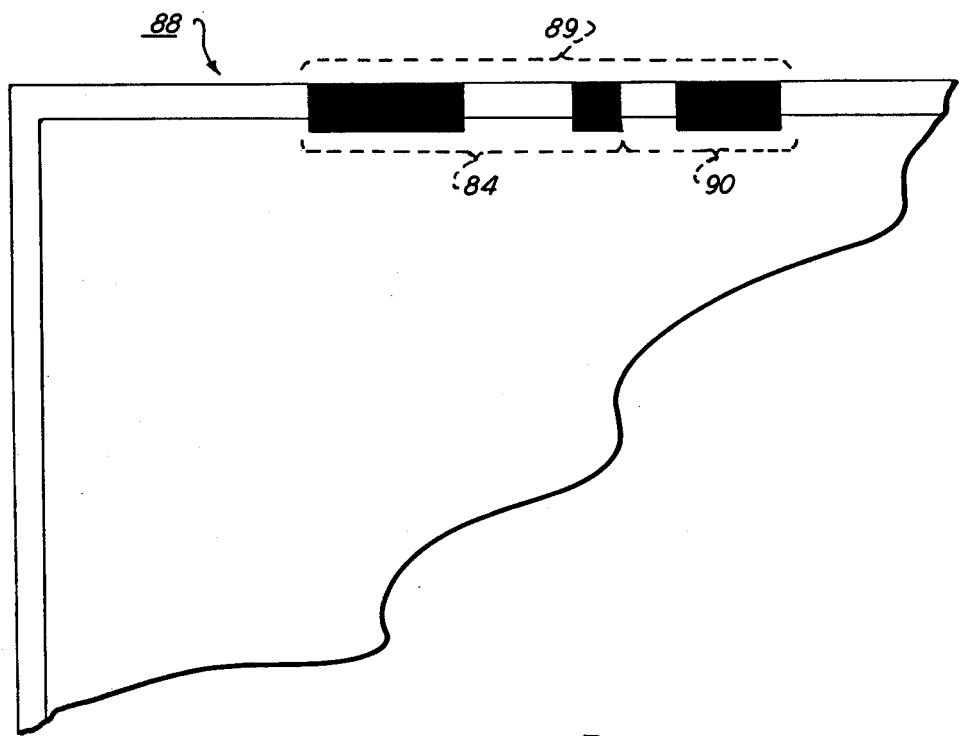
FIG. 5B is an enlarged, fragmentary view of a pause card.
Figure 5A:
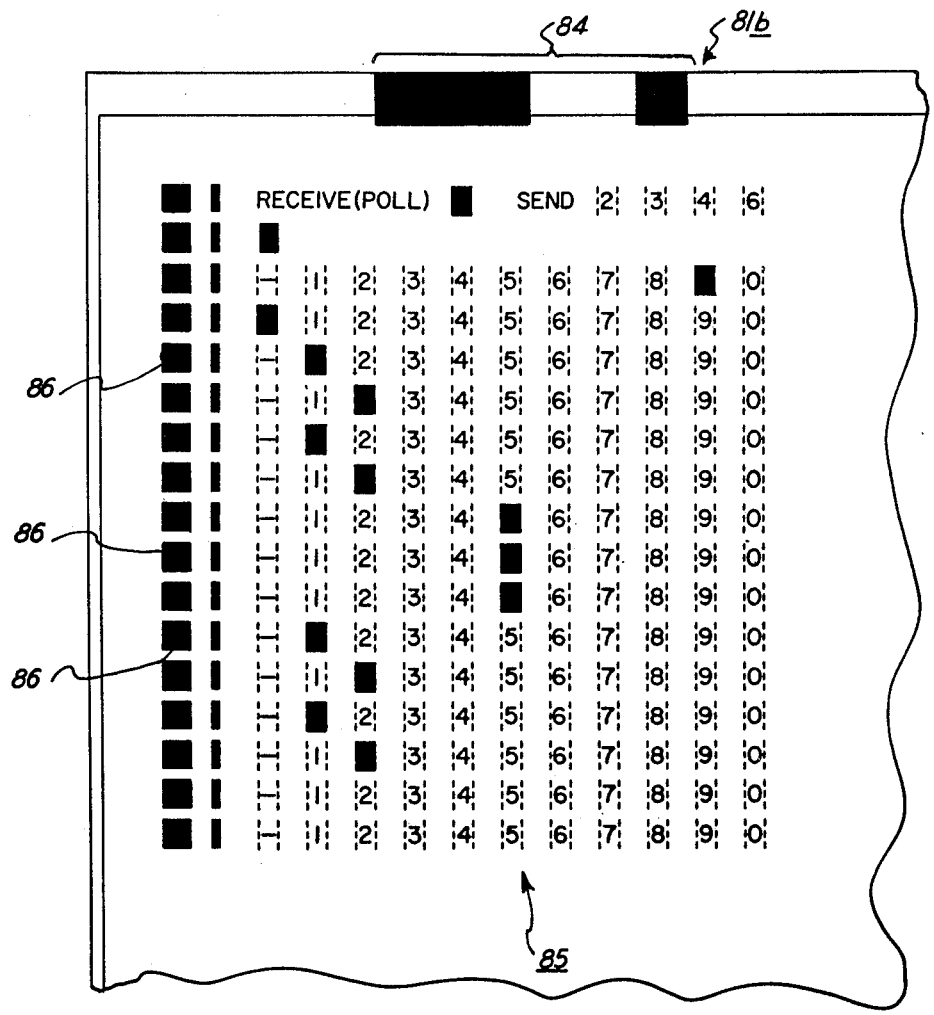
FIG. 5A is an enlarged front view of an address card.

Turning now to the drawings, and at this point especially to FIG. 1, there is an automatic telephone dialer 31 which is particularly well suited for use with a dedicated or non-dedicated facsimile terminal 32 having a raster input scanner 33 (FIG. 3). Indeed, there is synergism in that combination. Specifically, in keeping with one of the more important aspects of this invention, the automatic dialer 31 places outgoing telephone calls from the terminal 32 and conditions the terminal 32 for participation in facsimile communications in response to dialing and terminal control instructions which are read into the dialer 31 by the input scanner 33 of the terminal 32. It has, in short, been recognized that the raster input scanner 33 of a more or less conventional facsimile transmitter or transceiver teminal 32 can advantageously be utilized as an instruction reader for the dialer 31, thereby avoiding the extra expense and complexity of having to furnish the dialer 31 with a separate reader.

As shown, the automatic dialer 31 comprises a hook switch 34 for supporting a telephone handset 35 and a keyboard 36 for manually entering dialing and dialer control instructions. Dialing instructions entered via the keyboard 36 are accepted and executed by the dialer 31 only if the handset 35 is "off-hook", which indicates that the dialer 31 is being operated in a manual mode. All other instructions entered via the raster input scanner 33 and the keyboard 36 are accepted and executed while the handset 35 is "on-hook", thereby allowing the dialer 31 to perform in an automatic mode. For feeding raster scanned instructions and terminal status signals from the terminal 32 to the dialer 31 and for feeding terminal control signals and dialing pulses or frequencies from the dialer 31 to the terminal 32, there suitably is a multi-lead cable 37 coupled between the dialer 31 and the terminal 32.

In practice, the construction and operation of the automatic dialer 31 is unadvoidably dependent on the functional characteristics and compatability requirements of the facsimile terminal 32. Therefore, an exemplary terminal 32 will be briefly reviewed to set the stage for a more detailed treatment of the dialer 31.

To simplify this disclosure, the illustrated facsimile terminal 32 comprises a Xerox 200 Telecopier transceiver 38 which is interfaced with, say, the public switched telephone network by a standard data access arrangement 39 (FIG. 7), such as a CBS 1001F data coupler. A general familarity with the functional characteristics and the compatability requirements of that commercially available equipment is assumed. Consequently, the following discussion focuses on the features which are most relevant to the automatic dialer 31.

Preferably, the automatic dialer 31 supplements the facsimile terminal 32, whereby the existing capabilities of the terminal 32 are preserved. For example, the 200 Telecopier unit 38 is a half duplex facsimile transceiver which is selectively operable under local or remote control to function in a transmit mode or a receive mode at a document transmission rate of two, three, four or six minutes per standard 8½ inches × 11 inches page. Moreover, the comination of that transceiver 38 with a suitable data access arrangement or DAA 39 provides the terminal with the ability to automatically answer incoming telephone calls and to automatically disconnect incoming and outgoing calls.

1. An Automatic Document Feeder

Figure 2:
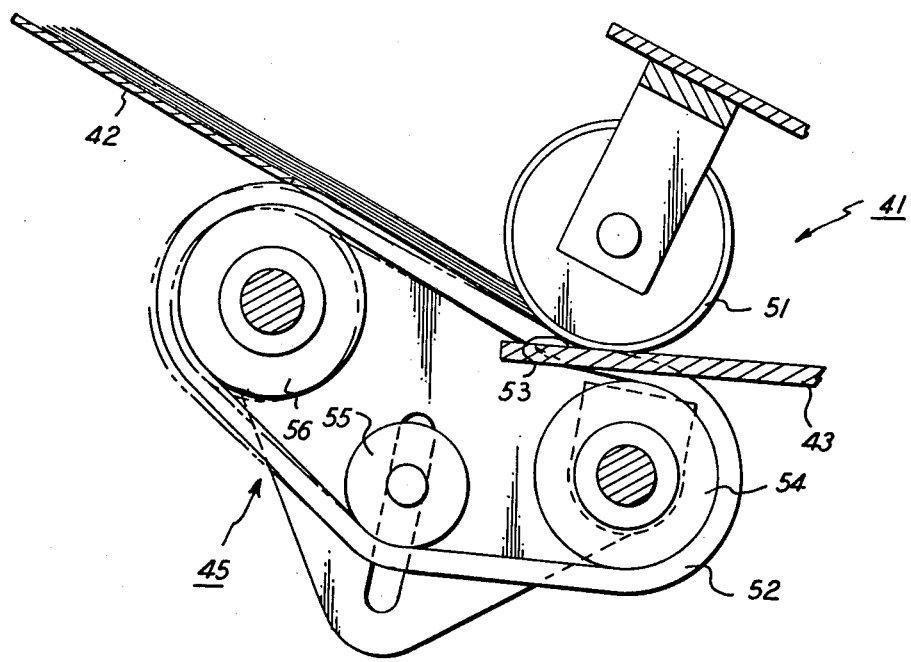
FIG. 2 is a fragmentary elevational view, partially in section, of an automatic document feeder for the transceiver of FIG. 1.

Referring to FIG. 2, the transceiver 38 has an automatic document feeder 41 (shown only in part) for serially feeding successive documents from an input tray 42 to an output tray 43 (FIG. 1) via a scan platen 44. As explained in additional detail in the aforementioned Mason et al. U.S. Pat. No. 3,869,569, the illustrated document feeder 41 has a bottom feeding, retard-type sheet separator 45 for separating the documents upstream of the scan platen 44. For that reason, the documents to be scanned are loaded into the input tray 42 image side down and are stacked in consecutive order so that the first document is at the bottom of the stack and the last is at the top.

Concentrating for a moment on the sheet separator 45, there is a retard wheel 51 which is frictionally engaged with an endless traction belt 52, thereby forming a feed nip 53 inboard of and slightly above the lead edge of the platen 44. The input tray 42 is inclined downwardly toward the nip 53. Additionally, when a feed command is given, the traction belt 52 positively urges the bottommost document in the input tray 42 into the feed nip 53. To that end, the traction belt 52 is extended through a slot (not shown) in the lead edge of the scan platen 44 and is trained around a drive wheel 54, an adjustable idler-type tension pulley 55, and an eccentric idler wheel 56. The eccentric 56 is radially aligned with a slot (also not shown) in the bottom of the input tray 42. Furthermore, the maximum and minimum radii of the eccentric 56, as supplemented by the finite thickness of the belt 52, are selected to be greater than and less than, respectively, the distance between the bottom of the input tray 42 and a generally parallel axis of rotation for the eccentric 56.

When a feed command is given, the drive wheel 54 is rotatably driven (by means not shown) in the direction of the arrow. Sufficient tension is maintained on the traction belt 52 to cause it to revolve in response to the rotation of the drive wheel 54, and that rotation is translated through the belt 52 to the tension pulley 55 and the eccentric 56. As a result of the rotation of the eccentric 56, the traction belt 52 is periodically lifted through the slot in the bottom of the input tray 42 and brought into frictional engagement with the lower surface or image side of the bottommost document in the input tray 42. Therefore, that document is positively urged into the feed nip 53 as the traction belt 52 continues to revolve. Any other documents in the input tray 42 are inhibited from entering the feed nip 53 because there is sufficient drag on the retard wheel 51 to prevent it from feely rotating. However, the rotation of the eccentric 56 periodically and alternately creates and releases a tension differential between the upper and lower reaches of the traction belt 52. When that differential is released or equalized, an impulse-like force of sufficient magnitude to index the retard wheel 51 is generated. Hence, the wear surface of the retard wheel 51 (i.e., the surface in frictional, sliding contact with the traction belt 52) is periodically advanced circumferentially thereby causing the retard wheel 51 to wear more or less uniformly.

In keeping with still further teachings of the above-identified Mason et al. patent, the document feeder 41 suitably includes a series of feed rollers (not shown) downstream of the sheet separator 45 for feeding the successive documents across the scan platen 44. Those rollers and the drive wheel 54 of the sheet separator 45 are typically driven in timed synchronism with the scanning cycle (described hereinbelow) of the transceiver 38 so that the documents enroute across the platen 44 are incrementally advanced a predetermined scan pitch distance during the flyback portion of each scanning cycle. If different scan pitches are to be accommodated, a factor common to all of the possible pitches is used as a basic step length, and the number of steps allotted to each scanning cycle is then controlled as a function of the selected scan pitch.

2. A Scanner/Printer Mechanism

Turning to FIG. 3, the transceiver 38 has a laser 61 and a scan mirror 62 which are alternatively and selectively utilized by the raster input scanner 33 and by a raster output scanner 63. This portion of the transceiver 38 is described in some detail in Mason U.S. Pat. No. 3,870,816, which issued Mar. 11, 1975 on an "Optical System for Transmit/Receive Mode Conditioning of Facsimile Transceivers" and which is hereby incorporated by reference. Additionally, the aforementioned Perreault et al. and Mason et al. patents elaborate on the relationship of the input and output scanners 33 and 63 to the transceiver 38.

Reviewing the optics of the transceiver 38 on a functional level, it will be seen that the collimated light beam emitted by the laser 61 is reflected from a first corner mirror 64 to a second corner mirror 65 and then to the scan mirror 62. A galvanometer-type drive mechanism 66 cyclically rotates the scan mirror 62 back and forth through a predetermined planar scan angle, thereby periodically deflecting or sweeping the laser beam in a predetermined line scanning direction. Downstream of the scan mirror 62 there is a flip mirror 67 which is selectively inserted into and removed from the optical path for the deflected laser beam so that the beam is alternatively routed to the raster input scanner 33 or the raster output scanner 63.

Unidirectional input scanning and output printing are achieved by synchronously blanking the laser 61 while the scan mirror 62 is counterrotating or flying back from an end of scan to a start of scan position. Preferably, the counterrotation of the scan mirror 62 is carried out at an appreciably higher angular velocity than the forward rotation so that only a relatively brief portion of each scanning cycle is consummed by the fly back period.

More particularly, when the transceiver 38 is operating in a transmit mode or a test mode, the flip mirror 67 is maintained in its solid line position (as shown in FIG. 3) to intercept and reflect the deflected laser beam from the scan mirror 62 to an elongated mirror 71 within the input scanner 33. During the forward rotation of the scan mirror 62, the laser 61 is excited to provide an output beam of constant intensity, and that beam is reflected from the mirror 71 to sweep across a line-like scanning station 72 on the scan platen 44. Hence, the documents to be scanned are illuminated in accordance with a predetermined raster scanning pattern as they pass over the scanning station 72 in a direction generally perpendicular to the line scanning direction. To convert the two dimensional information content of the documents into a corresponding one dimensional video signal, there is a scan line length photodetector (not shown) for generating a video signal in response to the light which is diffusely reflected from the successively illuminated areas of the documents.

In contrast, when the transceiver 38 is operating in a receive mode, the laser 61 is modulated in accordance with an incoming video signal, and the flip mirror 67 is maintained in its phantom line position so that the deflected laser beam passes from the scan mirror 62 to another elongated mirror 73 in the raster output scanner 63. Th laser beam reflected from the mirror 73 sweeps across a line-like printing station 74. Furthermore, the photoreceptor 75 of a xerographic processor 76 (shown only in part) is incrementally advanced past the printing station 74 during the fly back portion of each scanning cycle, at a rate dependent on the document transmission time selected, and in a direction generally perpendicular to the line scanning direction. Consequently, the video modulated laser beam provided by the laser 61 exposes the photoreceptor 75 in accordance with a predetermined raster scanning pattern to create a latent electrostatic image of the facsimile copy. Of course, that copy is then usually printed through the use of standard xerographic printing techniques.

B. The Automatic Dialer

Looking now to FIGS. 1-5, in keeping with this invention, the automatic dialer 31 is capable of executing dialing and terminal control instructions which are received from the raster input scanner 33 when address cards 81a-81c bearing mark sense indicia representing those instruments are scanned. In practice, the address cards 81a-81c and any associated subject copies 82 and 83 advantageously are loaded into the input tray 42 of the automatic document feeder 41 so that the scanning can be initiated on command.

1. An Address Card Format

Figure 4:
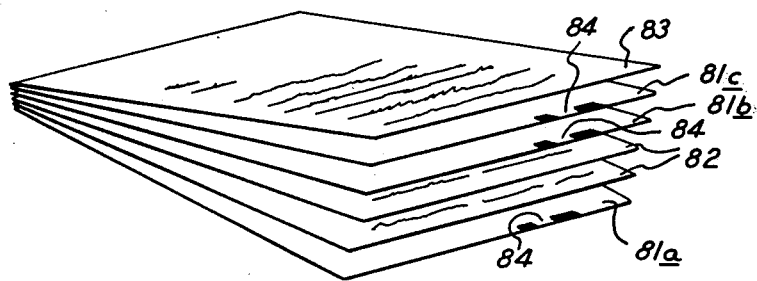
FIGS. 4 and 4A diagrammatically illustrates a typical sequence of address cards, pause cards and subject copies as stacked in the input tray of the automatic document feeder shown in FIG. 2.

Focusing on FIGS. 3-5, the raster input scanner 33 makes no distinction between address cards 81a-81c and ordinary subject copies 82 and 83. However, a distinctive bar code 84 is printed along the leading and trailing edge borders on the front and back of each of the address cards 81a-81c (the bar codes 84 on the loading edge borders of the back and front of the address card 81b can be seen in FIGS. 4 and 5, respectively). Consequently, whenever the input scanner 33 starts to scan one of the address cards 81a-81c, a predetermined unique sequence of black and white ("1" and "0") picture elements is generated to signal the automatic dialer 31 that an address card is being scanned, even if the card happens to be inverted or upside down.

To accommodate mark sense indicia representing operator selected terminal control and dialing instructions, there is an instruction field 85 comprising a plurality of orthogonal columns and rows on the front of each of the address cards 81a -81c. As best shown in FIG. 5, the columns extend in the scan pitch direction and are equidistantly spaced in the scanning direction to distinguish between mutually exclusive instructions. The rows, on the other hand, extend in the scanning direction and are equidistantly spaced in the scan pitch direction to distinguish between successive, consistent instructions. Here, for example, the first or uppermost row is several columns wide to provide a selection of mutually exclusive terminal control instructions calling for the transceiver 38 to operate in a transmit (send) mode at a document transmission rate of two, three, four, or six minutes per page or in a receive (polling) mode at a remotely determined document transmission rate. Next, there is a single column wide row which is dedicated to a dial tone instruction so that the automatic dialer 31 initiates the dialing only after pausing for a predetermined time period or confirming that dial tone is being received, depending on whether blind dialing is selected or not as described hereinbelow. The following rows are each several columns wide to allow for identification of the digits (0-9) which are to be serially dialed and of the intermediate dial tones (-) which should be received while placing an outgoing telephone call to a predetermined, remote station.

As illustrated, the address cards 81a-81c are asymmetrical. They are properly oriented for reading only if they are presented to the input scanner 33 front or instruction field side down and leading edge forward. Hence, if a misoriented address card is encountered by the input scanner 33, the automatic dialer 31 initiates a job abort process. That process is triggered whenever the automatic dialer 31 fails to receive instructions from the input scanner 33 within a predetermined period of time after detecting that an address card is being scanned.

A lapsed time decoding process is used by the automatic dialer 31 to identify or decode the instructions represented by the mark sense indicia entered within the instruction fields 85 of the address cards 81a-81c. To that end, each row of the instruction field 85 is preceded at a preselected distance by another distinctive bar code 86 so that the input scanner 33 supplies the automatic dialer 31 with another predetermined, unique sequence of black and white picture elements upon reaching a predetermined point in the scanning of each of those rows, thereby establishing a row-by-row timing reference for the automatic dialer 31. The order, spacing, and meaning of the potential instructions associated with the different rows of the instruction field 85 are known, and the sweep velocity of the input scanner 33 is also known. Therefore, the automatic dialer 31 decodes or identifies the selected instructions on the basis of the amount of time which passes during the scanning of each row of the instruction field 85 between the moment that the timing reference for that row is established and the moment that picture elements are received to indicate that a mark representing a selected instruction is being scanned.

Instructions represented by appropriate mark sense indicia entered within successive rows of the instruction field 85 of an address card are accepted and executed by the automatic dialer 31, provided that one and only one instruction is marked for selection per row. If more than one instruction is so marked within any given row, all instructions from that row are rejected because there is an inherent ambiguity. If, on the other hand, there are one or more intermediate rows of the instruction field 85 which have no instructions marked for selection, the automatic dialer 31 accepts, but does not execute, instructions represented by appropriate mark sense indicia entered in the subsequent rows because there is a potential ambiguity — viz., were the intermediate rows simply skipped or were instructions inadvertently omitted?

Some skew of the address cards 81a-81c relative to the scanning station 72 of the input scanner 33 is normal and expected, especially when the automatic document feeder 41 or similar device is used. Thus, to ensure that the address cards 81a-81c can be accurately read despite that skew, the printed bar codes 84 and 86 and the instruction representing mark sense indicia are preferably several times longer, as measured in the scan pitch direction, than the coarsest scan pitch of the input scanner 33.

2. A Keyboard/Display Unit for the Automatic Dialer

Figure 6:
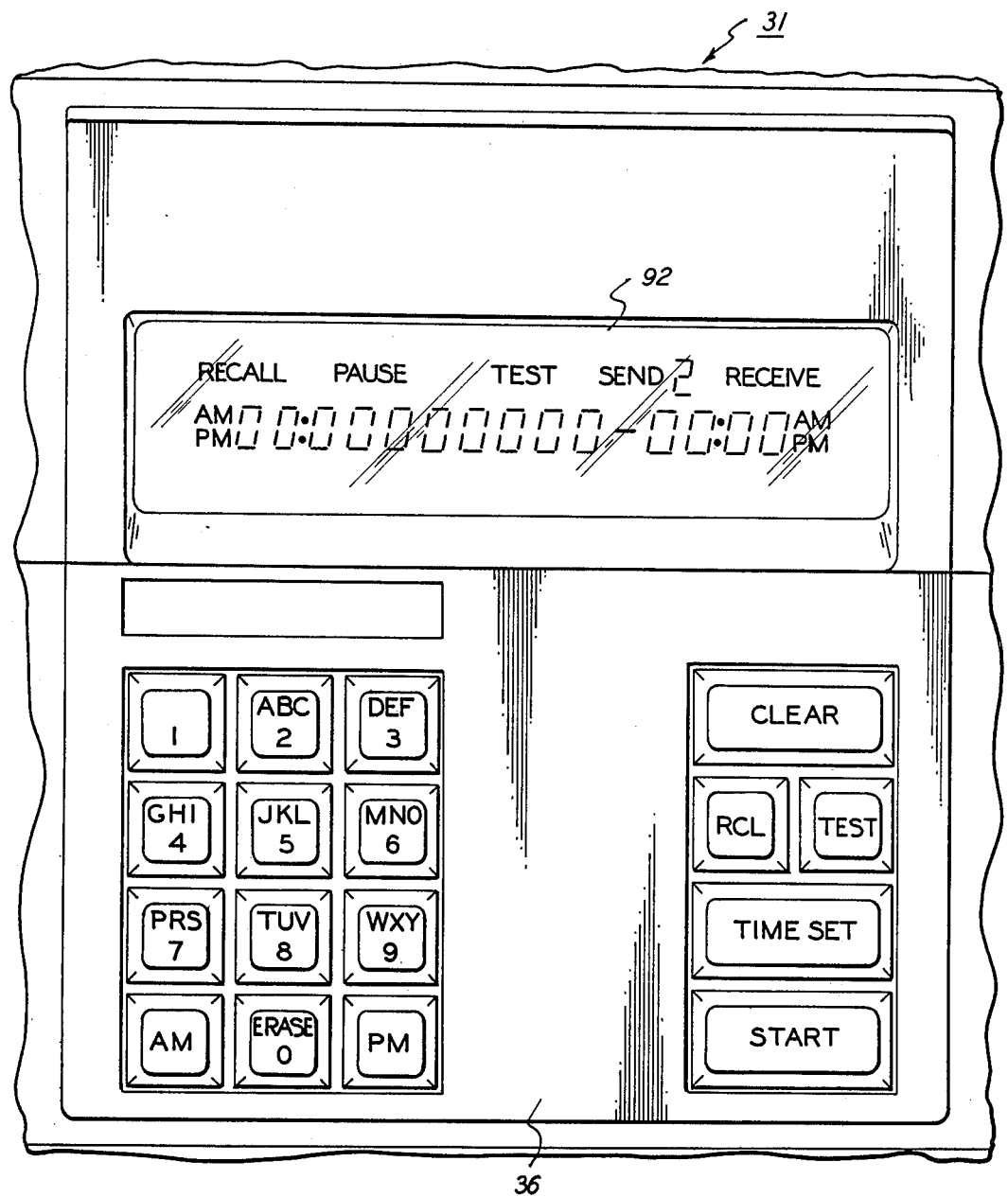
FIG. 6 is an enlarged top plan view of the automatic telephone dialer shown in FIG. 1.

As shown in FIGS. 1 and 6, the keyboard 36 and a display 92 are employed for purposes of operator interaction with the automatic dialer. Typically, the keyboard 36 comprises appropriately referenced alphanumeric keys and control keys for the operator to use in entering dialing and dialer control instructions into the automatic dialer 31. The display 92, on the other hand, has numerical indicia and suitable word legends which are selectively illuminated to keep the operator abreast of the status and performance of the automatic dialer 31.

Provision is made for selectively operating the automatic dialer 31 in an automatic mode or a manual mode to execute dialing instructions entered via the input scanner 33 or the keyboard 36, respectively. When an outgoing call is to be placed without scanning an address card, the operator manually prepares the transceiver 38 to participate in facsimile communications with a remote terminal and then removes the handset 35 from the hook switch 34 to signal the automatic dialer 31 that the manual mode has been selected. After confirming that initial dial tone is being received at the handset 35, the operator serially depresses appropriate ones of the alphanumeric keys on the keyboard 36 while continuing to listen for and, if necessary, pausing to receive any intermediate dial tones associated with the telephone number of the remote terminal, much in the same manner as is done when placing an ordinary telephone call. The automatic dialer 31 executes the keyboard enters dialing instructions in real time. Finally, when the call is answered, the operator listens for a ready tone from the remote terminal and then replaces the handset 35 on the hook switch 34 to initiate the facsimile communications. If an error is made in entering the dialing instructions or if the remote terminal fails to answer the telephone call or fails to provide a ready tone, a clear key is depressed to clear the dialing instructions which have been entered, thereby preparing the dialer 31 for another try at placing that same call or a different call.

All other dialing, terminal control and dialer instructions are entered into and executed by the automatic dialer 31 while the handset 35 is in place on the hook switch 34 to signal that an automatic mode of operation is called for. An immediate or manual start instruction is entered if the operator depresses a start key. Alternatively, the operator may choose to enter a delayed start instruction. In that event, the operator depresses the time set key and then enters a selected time of day for the delayed start by sequentially depressing appropriate ones of the alphanumeric keys followed by either the AM or PM key. Additionally, the operator may cause the contents of a recall memory, which is described hereinbelow, to be read out byte-by-byte on the display 92 by repeatedly depressing a recall key at a rate in excess of a predetermined memory recycling rate. Moreover, if the recall key and an erase key are repeatedly and alternately depressed at a rate sufficient to prevent recycling, the recall memory is cleared during the read out process. Also, there is a test key which the operator may operate to obtain a read out on the display 92 of the dialing and terminal control instructions read off an address card by the input scanner 33, without having those instructions executed by the automatic dialer 31.

Shared function keys may be utilized on the keyboard 91, provided that provision is made for discriminating between the different instructions which may be furnished by depressing such a key. For example, in the illustrated embodiment, the alphanumeric "0" instruction and the dialer control "erase" instruction are suitably associated with a single key because the automatic dialer 31 requires that the "erase" instruction be immediately preceded by a "recall" instruction, thereby providing a basis for discriminating between the two different instructions associated with that one key.

The display 92 suitably comprises a gas discharge display panel having several spaced apart numerical display elements and legend display elements. In keeping with accepted practices, each of the numerical display elements has a solid anode and a segmented cathode — viz., the cathode is composed of seven electrically isolated segments which are arranged so that any numeral (0-9) or a dash (-) may be displayed by selectively energizing appropriate ones of those x cathode segments. The anodes of the several numerical display elements are electrically isolated from one another, but the positionally corresponding cathode segments are electrically interconnected. Similarly, each of the numerical display elements includes an electrically isolated anode and a segmented cathode. However, each of those segments is sculptured to define an individual letter or symbol of a word legend such as "send", "receive", "test", "recall" or "pause" or of a symbolic legend, such as "AM", "PM" or ":". External electrical connections are made between the cathode segments of each individual legend display element, and internal electrical connections are made between the cathode segments of different legend display elements.

Under quiescent conditions, the display 92 provides a running time-of-day indication. If a delayed start instruction is entered into the automatic dialer 31, the display 92 additionally displays the time-of-day which has been selected for the delayed start. Hence, the operator can determine at a glance whether there is a delayed start to be executed and, if so, the amount of time remaining until the delayed start is to be carried out. A recall indication is displayed, without blanking the actual or delayed start time-of-day indication, if the subsequently described recall memory contains instructions which have not been executed for one reason or another. Indeed, if the recall memory is nearly or completely full, a flashing recall indication is displayed to warn the operator that the automatic dialer 31 is in a soft stop state.

To limit the number of display elements required of the display 92, the actual and delayed start time-of-day indications are blanked whenever the automatic dealer 31 receives an instruction to execute a manual or a delayed start instruction, a test instruction or a recall instruction and whenever the automatic dialer 31 is switched into a manual mode of operation. When a manual start, a delayed start or a test instruction is being executed the display 92 displays the dialing and terminal control instructions which are being read into the automatic dialer 31 by the input scanner 33. Similarly, when a recall instruction is being executed, the display 92 displays the data read out of the recall memory. Lastly, when the automatic dialer 31 is being operated in a manual mode, the display 92 displays the dialing instructions entered via the keyboard 91.

3. A Program Controlled Embodiment

Figure 7:
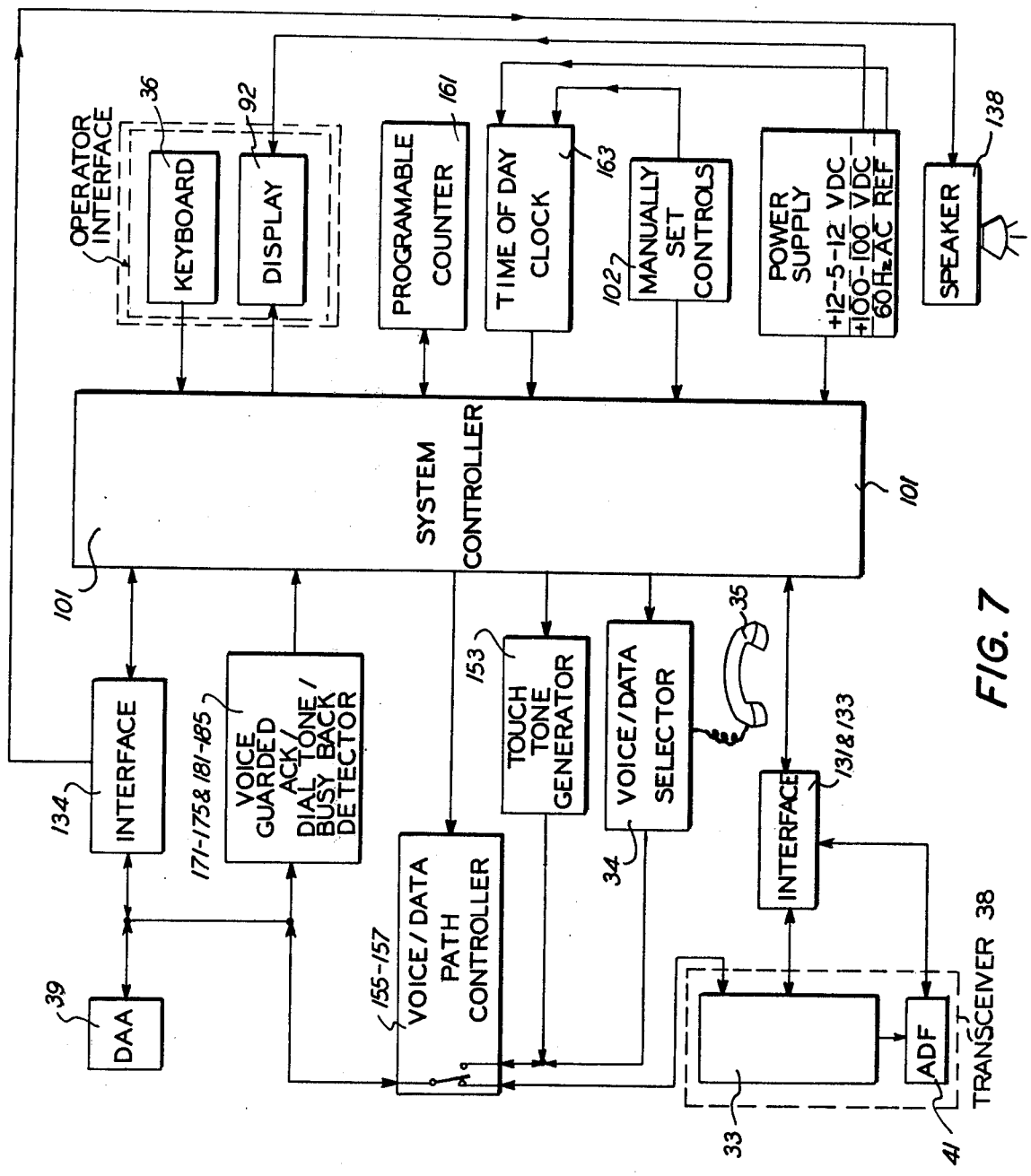
FIG. 7 is a functional block diagram of the automatic dialer in combination with the exemplary transceiver.

Referring to FIG. 7, a practical and economical embodiment of the automatic dialer 31 takes advantage of the simplicity and flexibility associated with the use of a programmed system controller 101. For example, relatively straightforward manually set controls 102 may be included to allow the operator to select (a) pulse or (b) dual tone, multiple frequency (DTMF)(c) blind or (d) dial tone responsive dialing. An automatic retry capability may be included in the system controller 101 so that calls that are not completed are automatically retried for a predetermined number of times, and the operator may use another of the manually set controls 102 to cause the retrys to be performed after a long or short pause. Additionally, the automatic dialer 31 can readily respond to the indication provided by the hook switch 34 (FIG. 1) to accommodate a manual or an automatic mode of operation. In short, these and other features of this invention are more readily implemented in software than in hardware.

Figure 8:
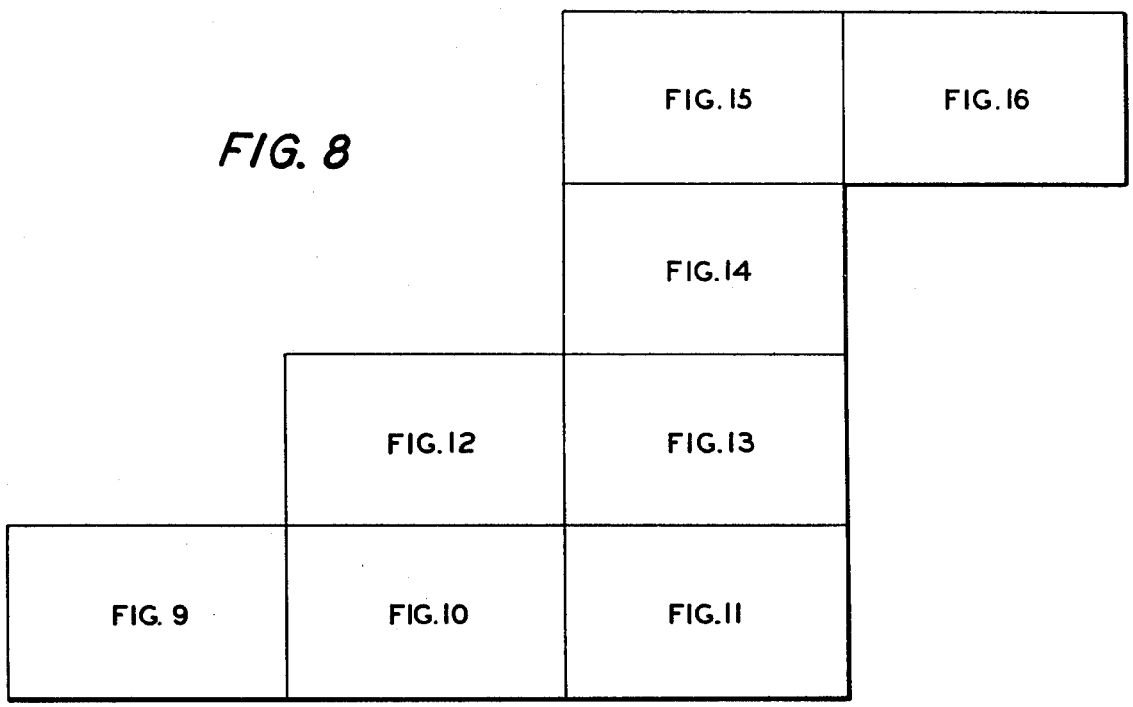

The system architecture depicted in FIG. 7 will be better understood upon referring to the specific embodiment of the automatic dialer 31 which is illustrated by FIGS. 9-16 when assembled as shown in FIG. 8.

Turning to FIGS. 9-16, it will be seen that the system controller 101 is a PPS-4 microcomputer which is manufactured and sold by Rockwell International Corporation, Microelectric Device Division. That unis is described in detail in "PPS-4 Microcomputer Programming Manual", Rockwell International Corporation Microelectronic Device Division, Document No. 29400 N31, October, 1974. That manual is hereby incorporated by reference, but a brief review of the PPS-4 microcomputer might still be helpful.

In keeping with a standard configuration for the PPS-4 microcomputer, the system controller 101 is a four bit parallel processor having a central processing unit (CPU) 102 comprising a twelve bit address bus 103, an eight bit instruction/data bus 104 and a single bit multiplexed control bus 105. A read only program memory (ROM) 106 and a random access data memory (RAM) 107 selectively interact with the instruction/data bus 104 in response to address words which are applied to the address bus 103 by a program address register 108 and a data address register 109, respectively. Specifically, when the ROM 106 is addressed by the program address register 108, program instructions are fetched from a predetermined location in the ROM 106 and fed through the instruction/data bus 104 for application to an instruction decode register III, a plurality of general purpose input/output (I/O) devices 112-114, and a keyboard/display (K/D) interface 115. Conversely, when the RAM 107 is addressed by the data address register 109, data is communicated between the RAM 107 and a four bit accumulator 116 via the instruction/data bus 104. If a write or load instruction is being executed, bits 5-8 of the instruction/data bus 104 are used to transfer the contents of the accumulator 116 into the addressed location of the RAM 107. If, on the other hand, a read or fetch instruction is being executed, bits 1-4 of the instruction/data bus 104 are used to transfer data from the addressed location of the RAM 107 into the accumulator 116.

A clock 117 generates A clock pulses at a base frequency of, say 199 KHz., and B clock pulse at twice that frequency or 398 KHz. Those clock pulses are applied to the RAM 107, the input/output devices 112-114, and the keyboard/display interface 115, thereby establishing a four phase timing cycle for the controller 101. The buses 103-105 are cleared or reset to a low ("0") logic level and the CPU 102 is prepared to execute any pending instructions during the first and third phases of each cycle. During the second phase of each timing cycle, the address inputs of the RAM 107 are inhibited so that the address bus 103 is available for feeding an address word from the program address register 108 to the ROM 106, thereby identifying the next instruction which is to be given.

If the preceding instruction from the ROM 106 was a data write or read instruction, the instruction/data bus 104 is employed during the second phase of the timing cycle for transferring the data between the RAM 107 and the accumulator 116. At the same time, the instruction decoder III sets a W I/O control bit on the control bus 105 to a high ("1") or a low ("0") logic level to signal the RAM 107 whether a data write or read instruction is to be performed. When a data read instruction is pending, the location of the data which is to be transferred from the RAM 107 to the accumulator 116 is pre-identified by virture of an address word which was applied to the RAM 107 by the data address register 109 during the fourth phase of the preceding cycle. Therefore, that instruction is executed during the second phase of the existing cycle. However, a data write instruction is not executed until the fourth phase of the existing timing cycle is reached. At that time, the data address register 109 feeds an address word through the address bus 103 to the RAM 107, thereby identifying a desired storage location for the data transferred from the accumulator 116 to the RAM 107.

The next instruction is read out of the ROM 106 through the instruction/data bus 104 during the fourth phase of each timing cycle. That instruction is immediately examined by the instruction decode register III, whereby the W I/O control bit on the control bus 105 is set to a high ("1") or a low ("0") logic level during the fourth phase of the timing cycle depending on whether the new instruction is an input/output instruction or a data memory (i.e., read or write) instruction. If another data memory instruction is being given, the above-described process is repeated. If, on the other hand, an input/output instruction is being given, the process is modified to provide for a direct transfer of data between the accumulator 116 and an appropriate one of the input/output devices 112-114 or the keyboard/display interface.

Input/output instructions are each composed of two bytes. The first byte is fed from the ROM 106 to the instruction decode register III during the fourth phase of one timing cycle, whereby the W I/O control bit on the control bus 105 is then set to a high ("1") logic level. That enables the input/output devices 112-114 and the keyboard/display interface 115 and also inhibits the RAM 107 from feeding data onto or accepting data from the instruction/data bus 104 during the next timing cycle. When the second phase of that next cycle is reached, the program address register 108 feeds the address word identifying the location of the second byte of the input/output instruction to the ROM 106 over the address bus 103. That byte is, in turn, read out of ROM 106 during the fourth phase of that same cycle and is then applied to the input/output devices 112-114 and the keyboard/display interface 115 via the instruction/data bus 104. Bits 5-8 of the second byte of the input/output instruction point to a specific one of the devices 112-115, while bits 1-4 identify the operation which is to be performed by that device.

The program address register 108 is a twelve bit register which is organized into two sections. The six most significant bits within the register 108 provide a fixed count which can be changed only under program control, while the six least significant bits define a running count which is automatically incremented by one for each timing cycle of the controller 101, unless otherwise directed under program control. To accommodate branch routines and subroutines, a twelve bit program return register 121 and a twelve bit save register 122 are connected in series with the program address register 108 to provide a two level stack for holding program reentry addresses. For obtaining additional stacking of reentry addresses in the RAM 107, the program return register 121 is split into three segments of four bits each which can be sequentially shifted into and out of the accumulator 116 under program control. Moreover, the bits being transferred from the program return register 121 to the accumulator 116 may be operated on by an arithmetic logic unit (ALU) 123 if an appropriate program instruction is given.

Similarly, the data address register 109 is a twelve bit register which is divided into three separate four bit segments. Usually, the count stored within the register 109 is incremented by one under program control for each timing cycle of the controller 101. However, the four most and least significant bits of that count may be directly modified under program control by the accumulator 116, and the other or middle four bits may be indirectly modified under program control by the accomulator 116 through an exchange register 124. The exchange register 124 is a temporary four bit static storage register which may be used to temporarily store the contents of the accumulator 116 or to transfer the contents of the accumulator 116 into the middle four bit positions of the data address register 109.

As will be appreciated, the accumulator 116 is the primary storage for the CPU 102. It participates in the exchange and transfer of all active input and output data, whether received from or enroute to the RAM 107, the data address register 109, any one of the input-/output devices 112-114, the keyboard/display interface 115, the program return register 121, the arithmetic logic unit 123, or the exchange register 124. Data may be read into or out of the accumulator 116, under program control, via bits 1-4 and 5-8, respectively, of the instruction/data bus 104 during the second phase of any timing cycle of the controller 101. Furthermore, data may be transferred to or from the accomulator 116 internally of the CPU 102 during other phases of the timing cycle since those transfers are carried out without using the instruction/data bus 104. For example, if an instruction commanding a modification of the contents of the program address register 108 is given, the flow of data from the accomulator 116 to the program return register 121 and from there to the program address register 108 is completely isolated from the instruction/data bus 104.

The accumulator 116, the arithmetic logic unit 123, and a one bit carry register 125 provide a four bit parallel adder having carry-in and carry-out capabilities, whereby data words which are multiples of four bits may be accommodated.

Additionally, there are a pair of flip-flops 126 and 127 which may be independently set, reset and tested under program control in response to signals supplied by the instruction decode register 111. That means that the flip-flops 126 and 127 may function as status indicators. Here, for example, the flip-flops 126 and 127 are set as a section of the RAM 107 which is dedicated to a recall memory approaches and reactes, respectively, a fully loaded state, whereby the recall indication on the display 92 is flashed as the last few recall memory storage locations are being filled and then the automatic dialer 31 is brought to a soft stop if the last of those locations is filled.

The input/output devices 112-114 for this embodiment are the standard general-purpose input/output devices available from Rockwell International Microelectronic Device Division (under Part No. 10696) for use with the PPS-4 microcomputer. Such of them includes static twelve bit input sampling gates, together with a twelve bit output buffer which can be modified under program control.

As illustrated, to carry out the present invention, provision is made in the automatic dialer 31 to provide the following input control signals for a Xerox Telecopier transceiver under program control:

| Signal | Significance of True or High ("1") Logic Level State |
|---|---|
| SCANS | A forced indication that the trail edge switch (not shown) in ADF 41 is actuated. |
| TRAYS | A forced indication that at least one document remains in tray 43 of ADF 41. |
| ENADF | A document is to be fed by the ADF 41. |
| FSTSPN | The ADF 41 is to feed the document at a fast feed rate. |
| SENDL | A "send" lamp (not shown) on the scanner/printer 33 is to be lit. |
| ONLINL | An "on-line" lamp (not shown) on the scanner/printer 33 is to be lit. |
| TESTML | A "test" lamp (not shown) on the scanner/printer 33 is to be lit. |
| RECVL | A "receive" lamp (not shown) on the scanner/printer 33 is to be lit. |
| ASPSWN | Document transmission rate for scanner/printer 33 to be selected independently of automatic dialer 31. |
| TESTBN | Test mode command not given to scanner/printer 33. |
| EOTAL | Sound an audible end-of-transmission alarm (not shown) within the scanner/printer 33. |
| DMTRN | Enable main drive motor (not shown) of scanner/printer 33. |
| ADSP2N ADSP3N ADSP4N ADSP6N | Automatic dialer 31 not to establish a two, three, four or six minute, respectively, document transmission rate for the scanner/printer 33. |
| ADBMDN | Enable billing meter (not shown) within the scanner/printer 33. |
| DDISSN | Scanner/printer 33 enabled to detect a disconnect by the DAA. |
| DISCTN | Scanner/printer 33 inhibited from initiating a disconnect by the DAA. |
| STRBN | Start command not given to scanner/printer 33. |

Figure 13:
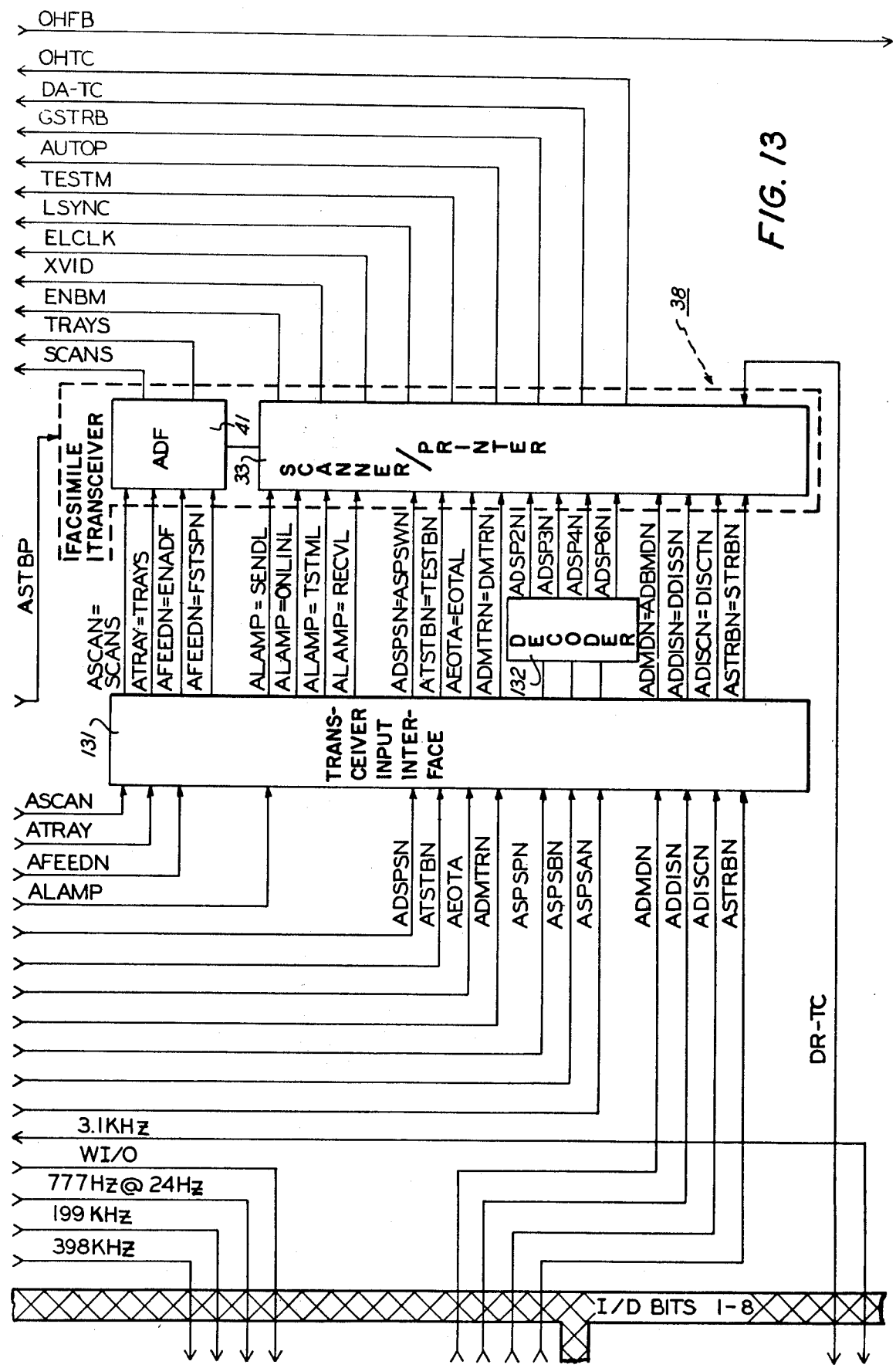

As indicated by the legends appearing in FIG. 13, direct counterparts to most of the above-identified signals are fed from the buffered outputs of the input/output devices 112 and 113 to control inputs of the transceiver 38 by means of a suitable input interface 131, which is included to transform logic levels and to perform simple logical functions. A notable exception exists in the case of ADSP2N, ADSP3N, ADSP4N and ADSP6N, which are generated by a decoder 132 in response to the logic levels of automatic dialer speed select signals ASPSAN, ASPSBN and ASPSPN provided under program control. ASPSAN and ASPSBN allow for four different bit combinations (00, 01, 10 and 11) and, therefore, are sufficient to indicate whether the scanner/printer 33 is to operate at a document transmission rate of two, three, four or six minutes/page. ASPSPN is included to provide the additional bit that is necessary to signal whether the document transmission rate of the scanner/printer 33 is to be remotely determined or not.

The output signals of the Xerox 200 Telecopier transceiver, which are sampled under program control by the automatic dialer 31, are:

| Signal | Significance of True or High ("1") Logic Level State |
| --- | --- |
| SCANS | The trial edge switch (not shown) in the ADF 41 is actuated. |
| TRAYS | At least one document remains in the input tray 43 of the ADF. |
| ENBM | The billing meter (not shown) within the scanner/printer 33 is enabled. |
| XVID | The transmitted video represents a black picture element (white picture elements are represented by a low ("0") logic level signal). |
| ELCLK | A clock signal generated internally of the scanner/printer 33. |
| LSYNC | A scan line-by-scan line synchronizing signal generated internally of the scanner/printer 33. |
| TESTM | Scanner/printer 33 in a test mode. |
| AUTOP | Scanner/printer 33 in a print mode. |
| GSTRB | A gated start button indication from the scanner/printer 33. |
| DA-TC | Data available from the scanner/printer 33. |

Figure 14:
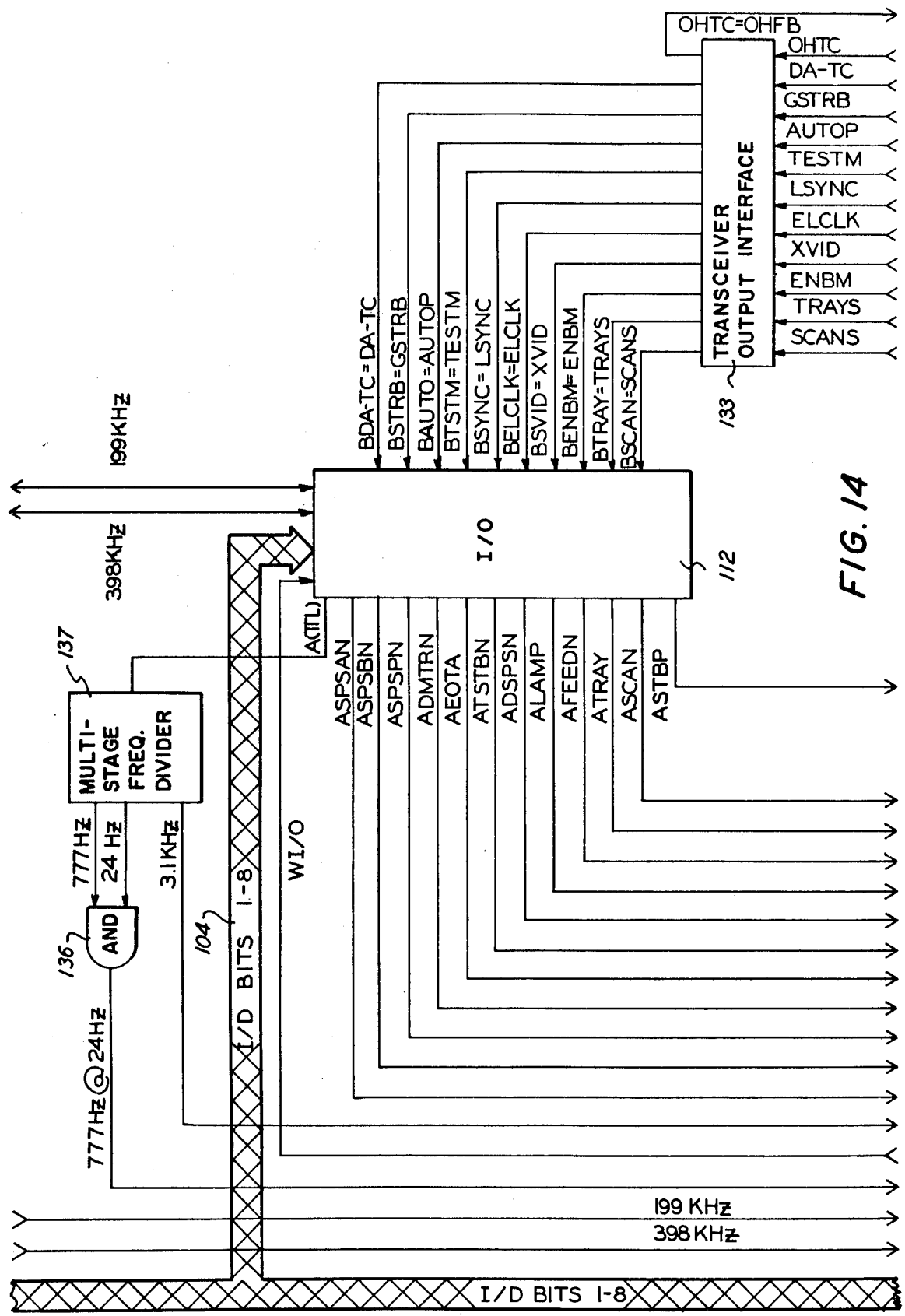

FIG. 14 shows that direct counterparts of each of these signals are fed through an appropriate output interface 133 to respective ones of the gated inputs of the input-/output device 112.

To enable the automatic dialer 31 to initiate a start by the transceiver 38 under program control, one of the buffered outputs of the input/output device 112 is used to apply a start signal ASTBP (automatic dialer start button push) to the transceiver 38. The start signal ASTBP is set to a high ("1") logic level under program control only when the automatic dialer 31 is executing a manual or delayed start instruction.

Figure 12:
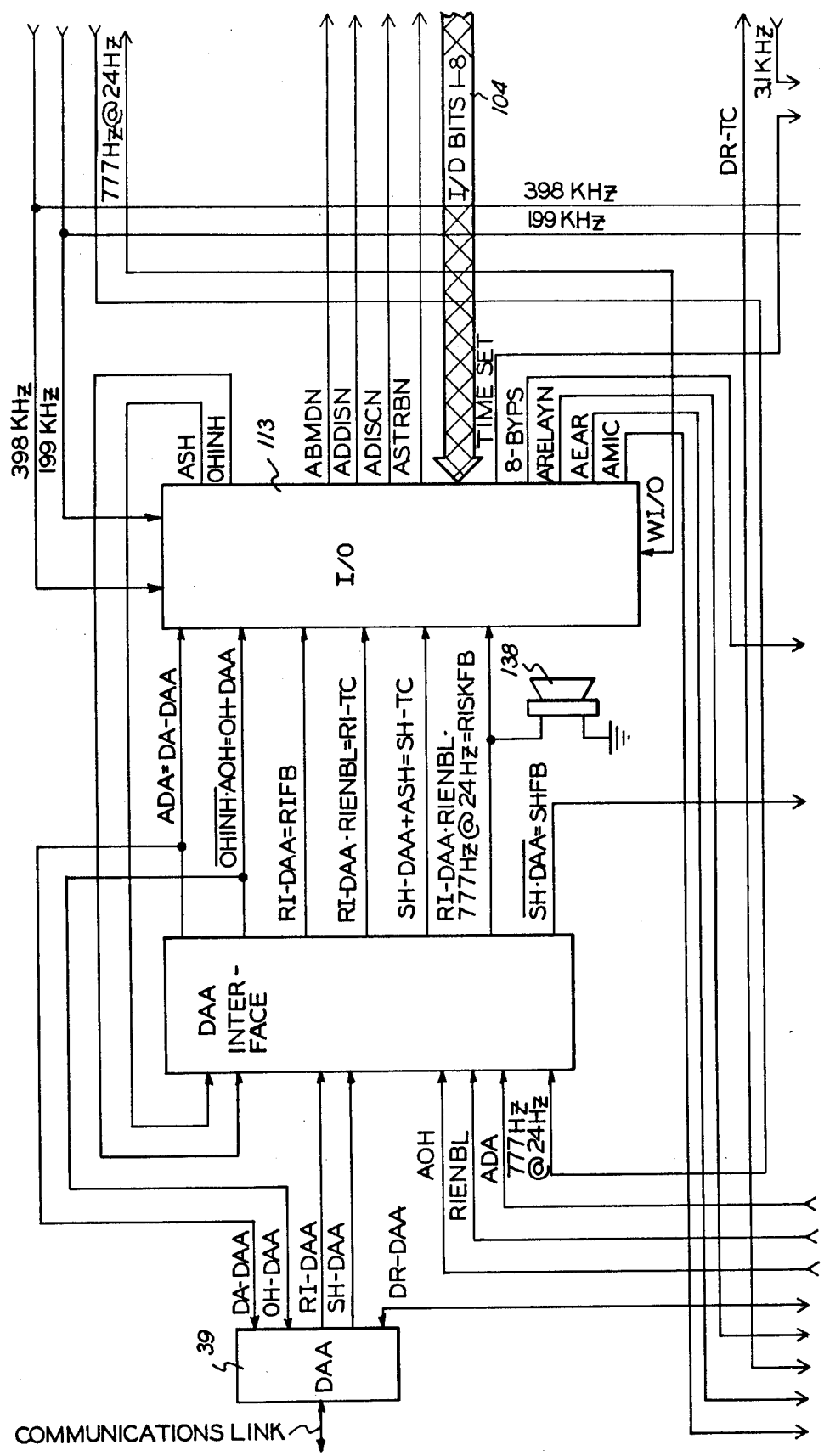

Turning to FIG. 12, the CBS 1001F data access arrangement 39 employed in the illustrated embodiment completes a voice/data path DR-DAA to a communications link when supplied with control signals indicating that data is available DA-DAA and that an off-hook instruction OH-DAA has been given. A ring detect signal RI-DAA and a switch hook signal SH-DAA are generated internally of the DAA 39 when a ringing voltage is applied and when the voice/data path DR-DAA is complete, respectively.

In keeping with this invention, provision is made for generating the DA-DAA and OH-DAA input control signals for the DAA 39 under program control. Furthermore, the status of the DAA 39 is monitored under program control. In this instance, there is an interface 134 between the DAA 39 and the automatic dialer 31 which performs several important logical functions in addition to the necessary logic level transformations.

As shown, the input signals applied to the DAA interface 134 are:

1. The ring detect RI-DAA and switch detect SH-DAA signals supplied by the DAA 39;

2. Automatic dialer switch hook (ASH) and an off-hook inhibit (OHINH) signals which are supplied by the input/output device 113 under program control — the ASH signal indicates that the handset 35 of the automatic dialer 31 is off hook and OHINH signal is an instruction to inhibit the DAA 39 from going off hook under the control of the automatic dialer 31;

3. Automatic dialer off-hook (AOH), ready (ADA) and ring enable (RIENBL) signals which are received from a discrete output buffer register 135 (FIG. 11) which, in turn, is loaded by the accumulator 116 under program control — the AOH, ADA and RIENBL signals indicate whether the automatic dialer 31 is online, ready and prepared for an incoming call, respectively; and 4. A 777 Hz signal gated at a 24 Hz rate which is provided by an AND gate 136 (FIG. 14) in response to 777 Hz and 24 Hz input signals supplied by a multistage frequency divider 137 which, in turn, is supplied with a TTL compatible input signal at the A clock rate of 199 Hz by the input/output device 112.

The functions the DAA interface 134 performs in response to these input signals include:

1. Supplying the DAA 39 with a DA-DAA control signal whenever the automatic dialer is in a ready state as indicated by the ADA signal and with an OH-DAA control signal whenever the automatic dialer is on line as indicated by the AOH unless the automatic dialer is requesting that the DAA 39 be inhibited from going off hook as indicated by the OHINH signal;

2. Feeding to the gated inputs of the input/output device 113, the DA-DAA and OH-DAA control signals being fed to the DAA 39, a ring feedback signal RIFB when a ring detect signal RI-DAA is present, a signal RI-TC indicating that there is an incoming call for the transceiver 38 to answer when a ring detect signal RI-DAA and a ring enable signal RIENBL are present, a signal SH-TC indicating that the transceiver 38 is off hook or busy when a switch hook signal is being received from either the DAA 39 (SH-DAA) or the automatic dialer 31 (ASH), and a gated ring feedback signal RISKFB when a ring detect signal RI-DAA, a ring enable signal RIENBL and the gated 777 Hz signal are present; and 3. Applying to a discrete input buffer 137 (FIG. 11) a switch hook feedback signal SHFB in the absence of a DAA switch hook signal SH-DAA.

Here the gated ring feedback signal RISKFB is also used to drive an audible alarm 138, whereby the operator is advised that the transceiver 38 is about to answer an incoming call.

Figure 17:
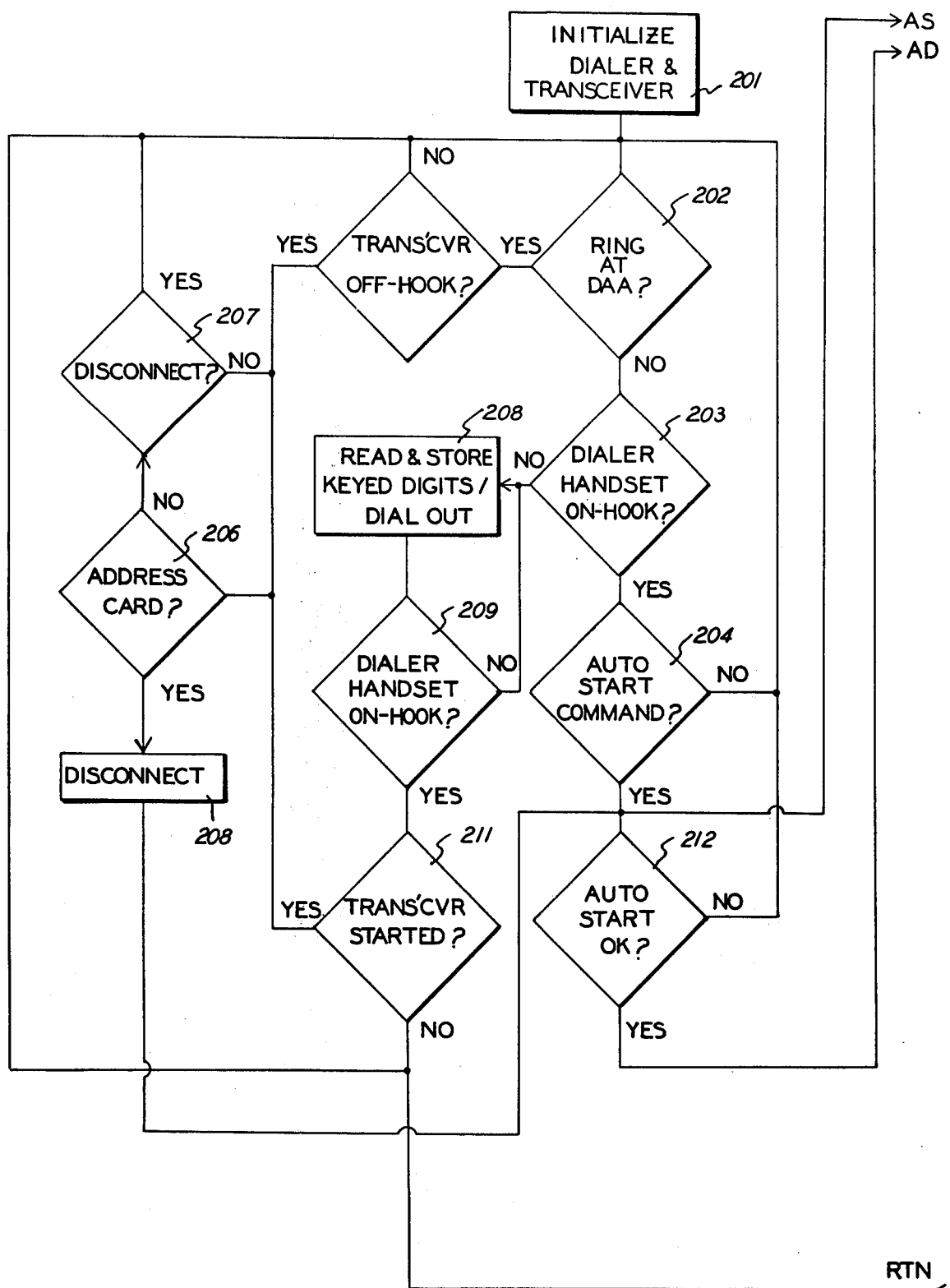
FIGS. 17 and 18, when joined as indicated at AD, RTN and AS, combine to form a functional flow chart illustrating the basic operation of the automatic telephone dialer.
Figure 18:
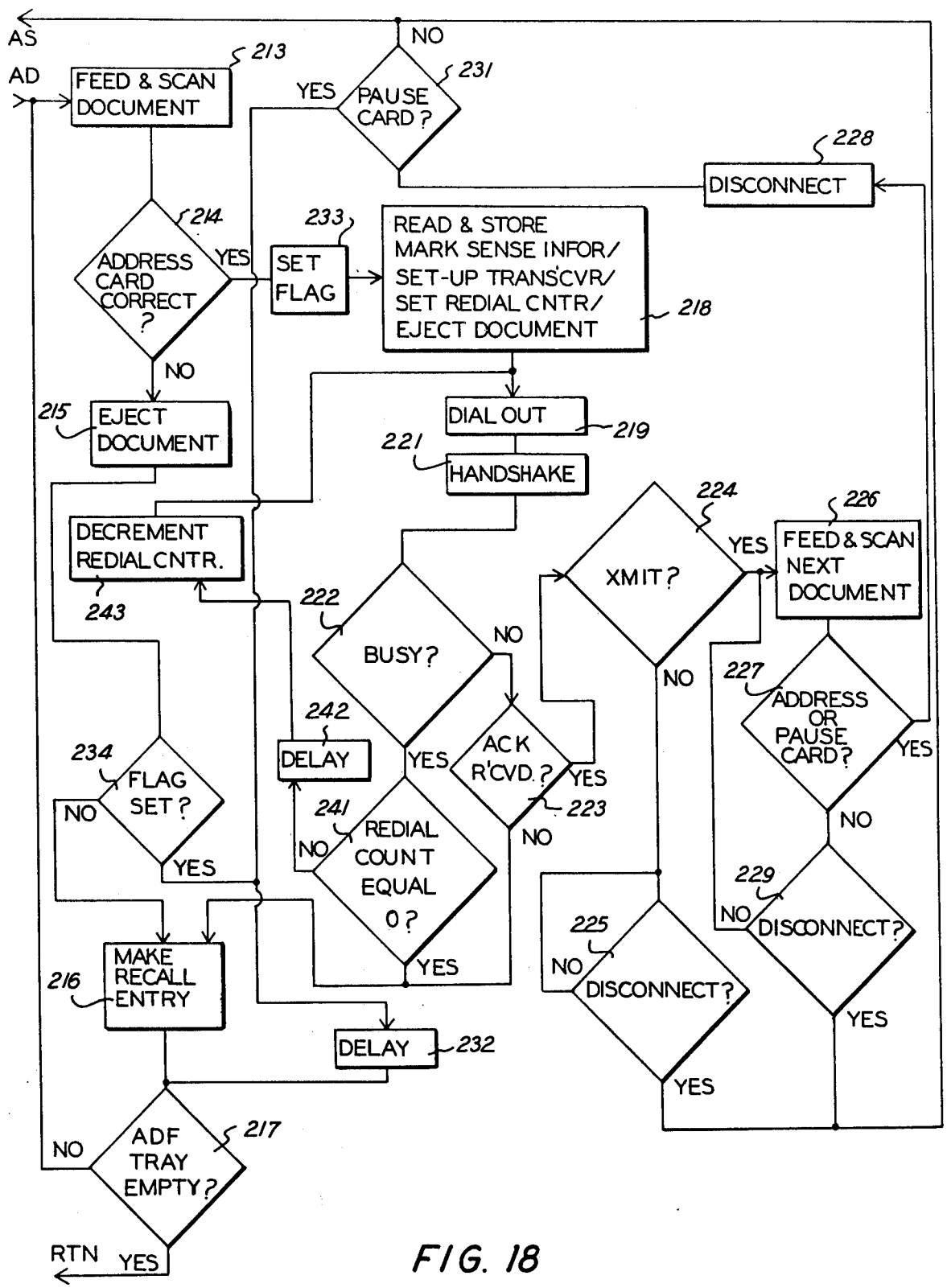

To bring this discussion into sharper focus, reference is additionally made to FIGS. 17 and 18 for a review of the operation of the automatic dialer 31. When power is first applied, the program address register 108 (FIG. 11) is reset or cleared, thereby automatically returning to the starting address for a routine which initializes the automatic dialer 31 and the transceiver 38 as indicated at 201. Next an idle loop routine is performed until a condition requiring an entry into one of three branch routines is detected. Sequential sampling is carried out while the idle loop routine is being performed to determine whether there is a ringing voltage applied to the DAA 39 (FIG. 12) as indicated at 202, whether the dialer handset 35 (FIG. 1) is off hook, as indicated at 203, and whether an autostart command has been given as indicated at 204. The branch routines performed when one or the other of these conditions is detected are dedicated to allowing the transceiver 38 to accept incoming calls, the manual mode of operation of the automatic dialer 31, and the automatic mode of operation of the automatic dialer 31, respectively.

More particularly, if the automatic dialer 31 detects a high ("1") logic level ring feedback RIFB signal at the input/output device 113 (FIG. 12) while performing the idle loop routine, the program address register 108 causes the ROM 106 to alternately enter into and exit from an incoming call branch routine until a high ("1") logic level off-hook feedback signal OHFB is detected at the discrete input buffer 137 (FIG. 11) to confirm that the transceiver 38 has answered the incoming call as indicated at 205. In this instance, as shown in FIGS. 13 and 14, the off-hook feedback signal OHFB is fed into the input buffer 137 by the transceiver output interface 133 in response to an off-hook signal which is generated internally of the transceiver 38 when it is on line. After confirming that the transceiver 38 is on line, the ROM 106 continues with the branch routine to allow the automatic dialer 31 to determine whether an address card is being scanned or not as indicated at 206 and, if not, whether the disconnect has been performed or not as indicated at 207.

To detect the scanning of an address card, the BSVID video signal applied to the input/output device 112 (FIG. 13) is more or less continuously compared against a picture element sequence stored in the RAM 107 to represent the predetermined sequence of picture elements which are generated when the distinctive bar code 84 is being scanned. If an affirmative comparison occurs, the signals necessary to disconnect the call are applied to the transceiver 38 and the DAA 39 under program control as indicated at 208. Otherwise, the call is allowed to continue to normal completion as indicated at 207. In any event, when the call is disconnected, the automatic dialer 31 returns under program control to the idle loop routine.

If a high ("1") logic level hook switch HOOKSW signal is detected at another discrete input buffer 138 while the idle loop routine is being performed, the automatic dialer 31 exits under program control from the idle loop routine and enters a branch routine dedicated to the manual mode of operation of the automatic dialer 31. As will be seen upon referring to FIG. 9, the hook switch HOOKSW signal is taken from the set or Q output of a flip-flop 141 which is set and reset in response to the off-hook and on-hook status, respectively, of the dialer hook switch 34.

Upon entering the manual operating mode branch routine, instructions are given under program control to read and store the digits the operator enters via the keyboard 36 and then dial out, as indicated at 208. Thus, a review of how these functions are performed is in order.

Figure 11:
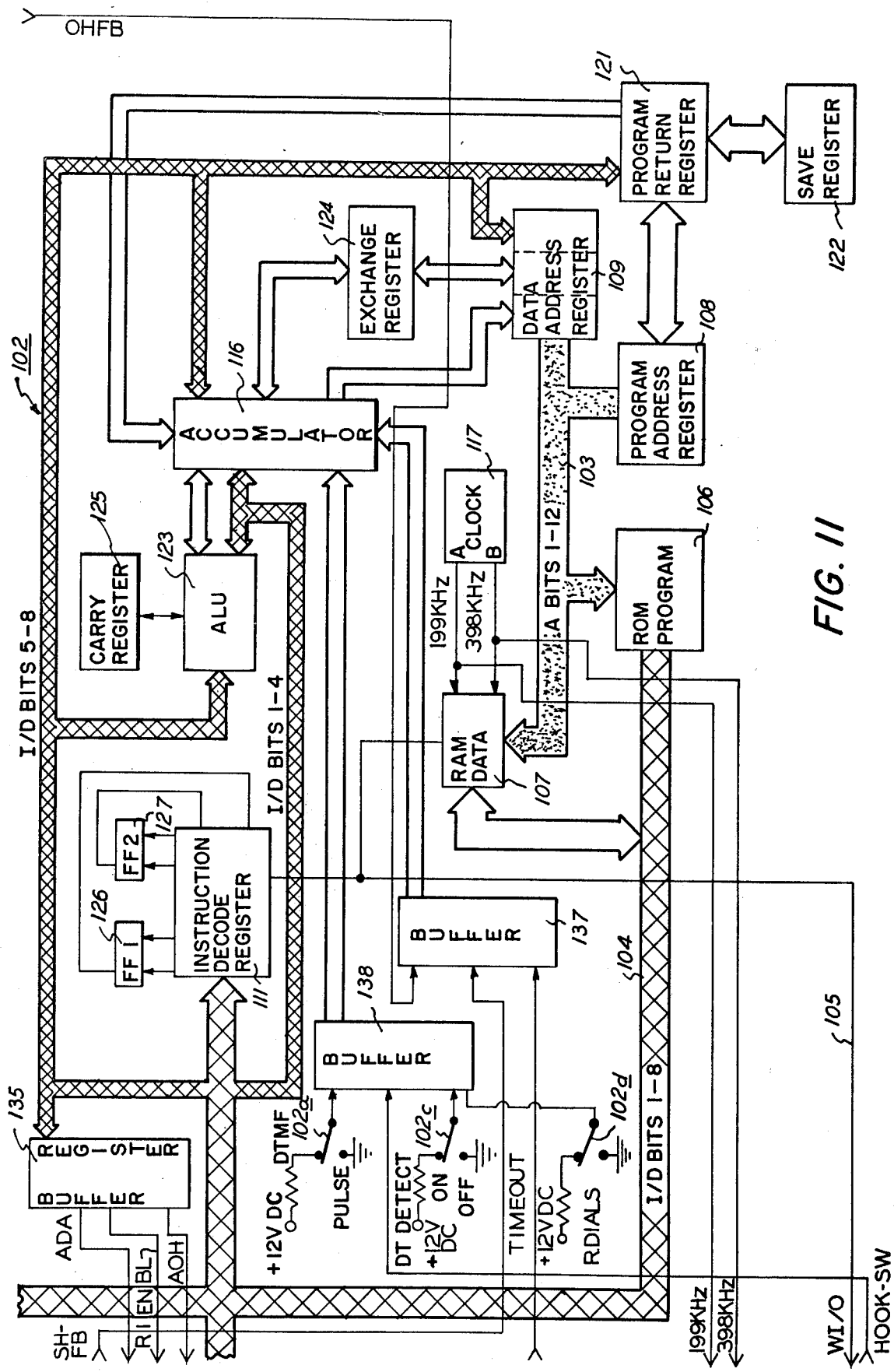
Figure 15:
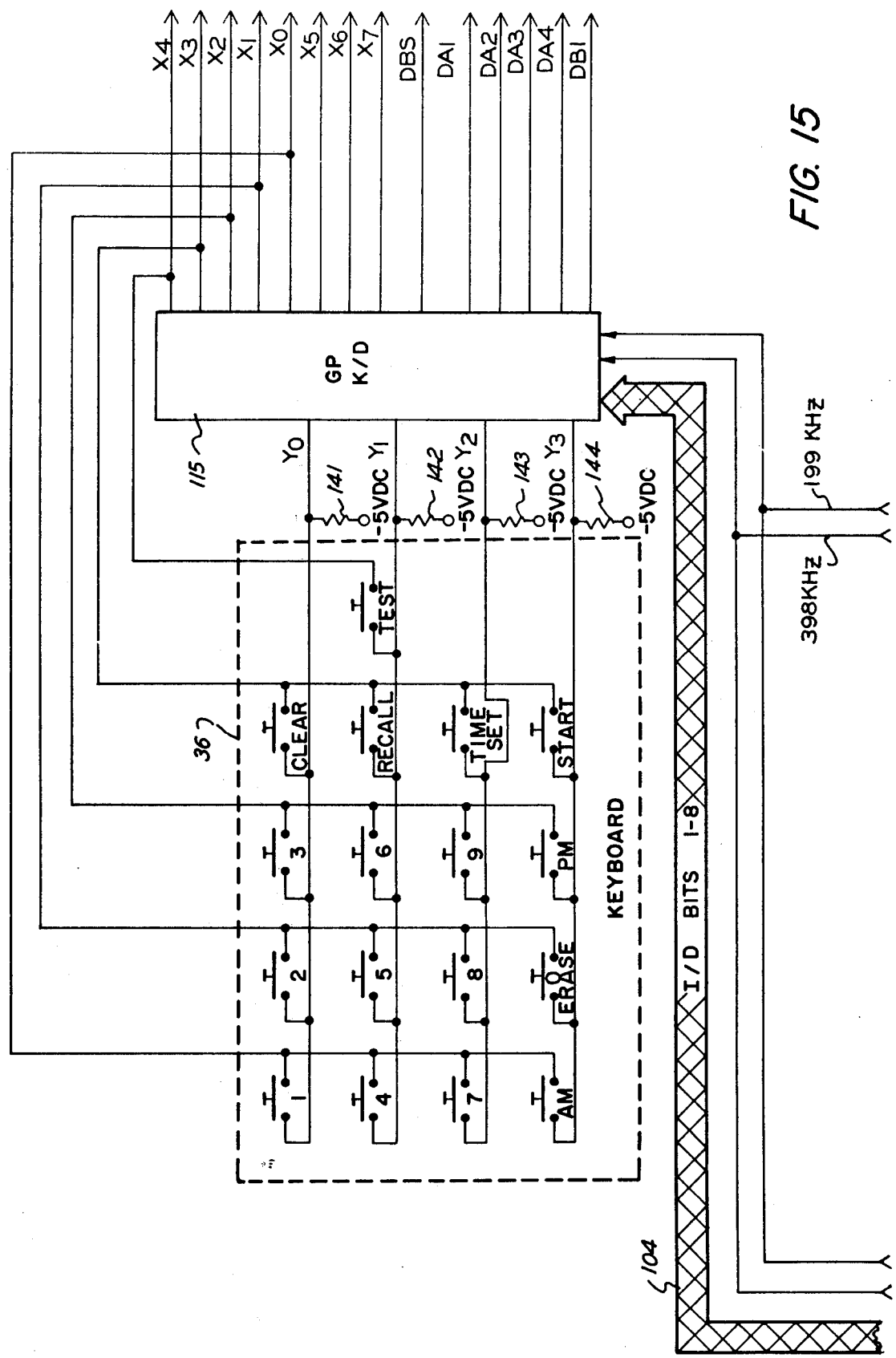
Figure 16:
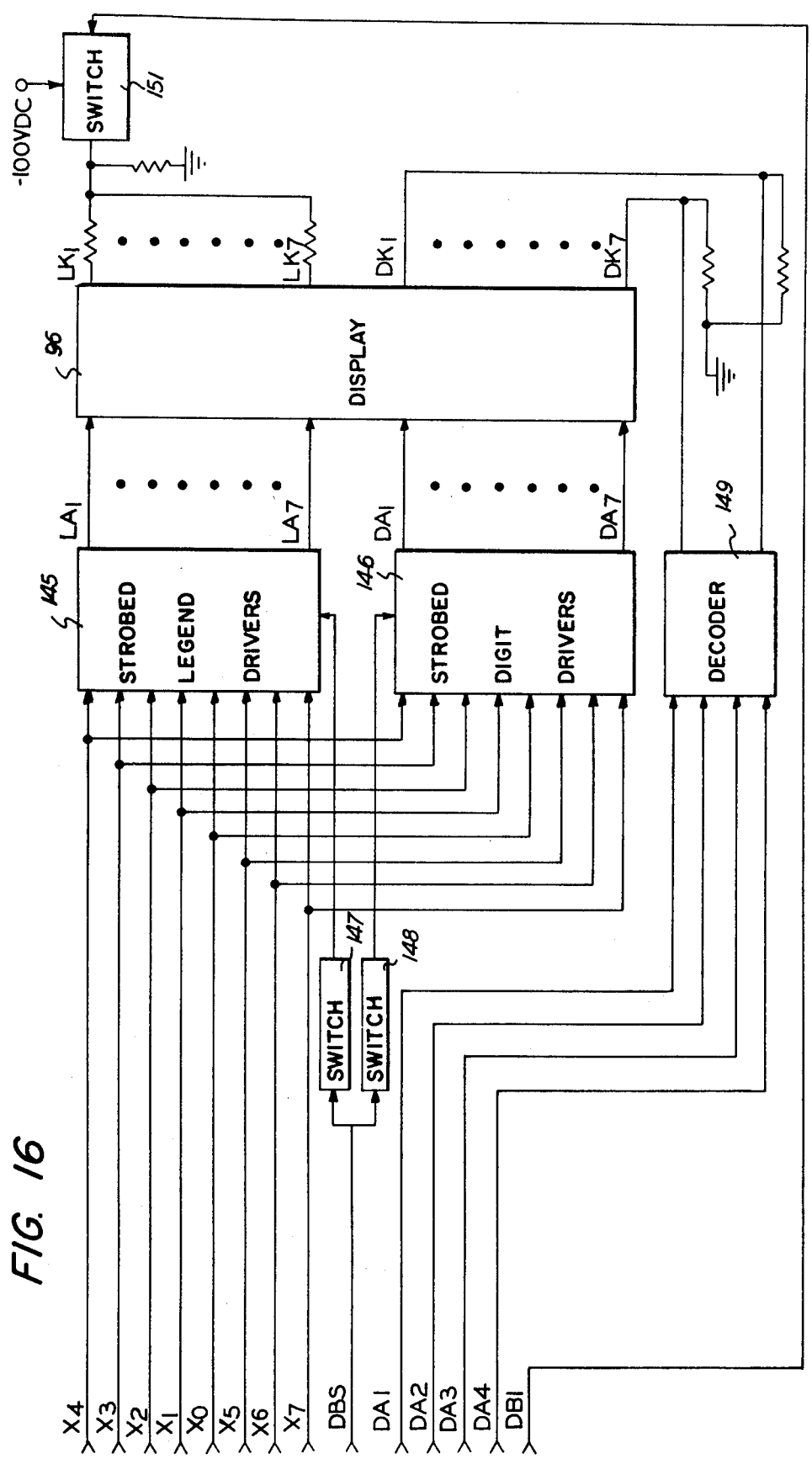

As shown in FIGS. 11 and 15, the keyboard/display interface 115 for this embodiment is the general-purpose keyboard/display device provided (under Part No. 10788) by Rockwell International Microelectronic Device Division for use with the PPS-4 microcomputer. Thus, the keys of the keyboard 36 are assembled in rows and columns to be read column-by-column and row-by-row via bits 5-8 of the instruction/data bus 104 when a keyboard-read instruction is given. In more detail, when such an instruction is given, the column leads $X_0$-$X_4$ are sequentially strobed during successive timing cycles while the row leads $Y_0$-$Y_3$ are read into the accumulator 116 on bits 5-8 of the instruction/data bus 104 for subsequent transfer to the exchange register 124. If a key within the column being strobed has been depressed, that bit will be at a high ("1") logic level, rather than a low ("0") logic level, it being understood that the leads $Y_0$-$Y_3$ are normally held at a low ("0") logic level by virtue of being returned to a suitable low logic level supply source (-5VDC) through respective voltage dropping resistor 141-144. The contents of the exchanger register 124 are, in turn, used to cause the program address register 109 to generate an address for reading a predetermined four bit representation of the depressed key into the accumulator 116 for subsequent transfer back to an active data storage address within the RAM 108. The process is repeated as further keys are depressed.

The binary representations (0-9) for the digit keys which are operated are read in order into successive address of a segment of the active data storage section of the RAM 108 which is dedicated to characterizing the numerical indicia which are to be displayed. Another segment of the active data storage section of the RAM 108 is dedicated to identifying the legends which are to be displayed.

To display the appropriate digital indicia and/or legends on the display 92, there are separate addresses within the display active data storage section of the RAM 108 for each of the numerical and legend display elements of the display 92. Those addresses are blanked, unless data is entered to indicate that the associated display element is to be illuminated. Numerical indicia to be displayed are each characterized by four bits, thereby uniquely identifying the specific numerical (0-9). A legend, on the other hand, is adequately characterized by setting a predetermined one of the four bit representation to a high ("1") or low ("0") logic level, depending on whether the legend is to be displayed or not.

If, say, the displayed digits and legends are to be updated, the four bit representations for the numerical and legend display elements are transferred, under program control, from the RAM 108 to be accumulator 116 and then via bits 1-4 of the instruction/data bus 104 to the keyboard/display interface 115 where the digit representations and the legend representations are shifted into separate storage registers (not shown). The anodes $LA_0$-$LA_7$ and $DA_0$-$DA_7$ of the legend and numerical display elements within the display 92 are sequentially strobed by appropriate drivers 145 and 146, respectively, while successive groups of four bits each are being shifted out of both interface storage registers. Furthermore, a steering bit DBS is applied to a pair of switches 147 and 148 to cause the drivers 145 and 146 to selectively strobe the anodes of the display elements on the lefthand side or the right-hand side of the display 92, depending on whether bits are being shifted out of the upper halves or the lower halves of the interface storage registers. A decoder 149 sequentially decodes the four bit representations DA1-DA4 of any numerical indicia which are to be displayed, thereby energizing appropriate ones of the cathode segments of the numerical display elements in timed synchronism with the strobing of the anodes of the different elements by which successive ones of those indicia are to be displayed. As previously mentioned, one bit DB1 is sufficient to indicate whether a legend is to be displayed or not. Thus, a switch 151 is operated in response to that one bit DB1 ofeach of the four bit legend representations to selectively energize the cathodes of the legend display elements in timed synchronism with the strobing of the anode of any legend display element which is to be illuminated. Of course, legends and numerics may be displayed jointly or independently under program control.

Figure 10:
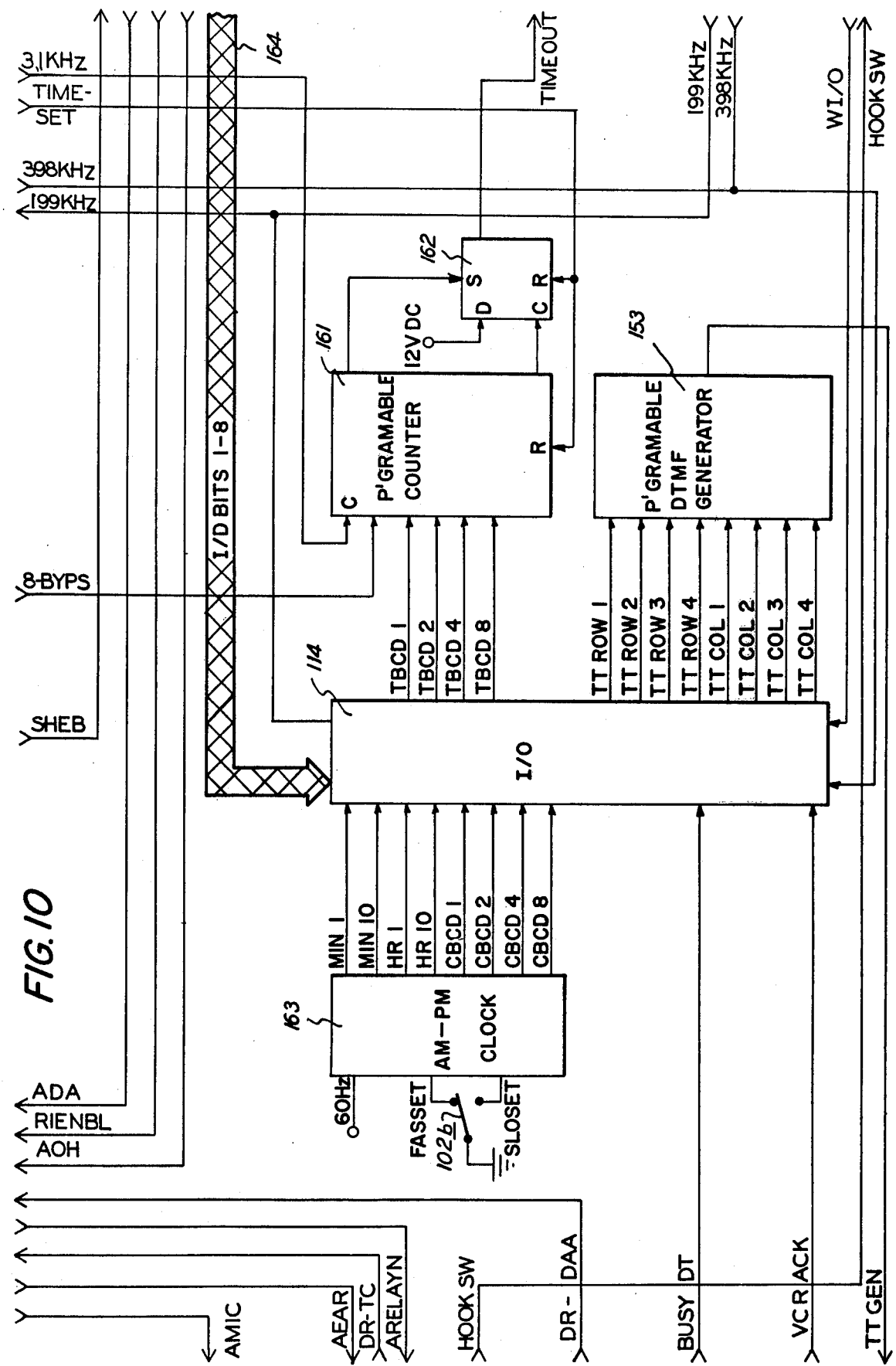

Dialing is accomplished by pulsing the autodialer off-hook signal AOH (FIGS. 11 and 15) or by generating suitable dual tone, multiple frequency (DTMF) dialing signals through the use of a tone generator 153 (FIG. 10). A switch 102a (FIG. 11) is set by the operator to input a high ("1") or low ("0") logic level signal to the discrete input buffer 138, thereby indicating whether DTMF or pulse-type dialing is to be employed. In either event, the digits to be dialed are represented by the four bit numerical representations stored in the active data, display dedicated segment of the RAM 108 when there is a call to be placed so that these digits are more or less concurrently displayed and dialed.

If pulse-type dialing is selected, the four bit representations of the digits to be dialed are sequentially transferred, under program control, from the active data section of the RAM 108 to a dial counter address within the RAM 108. In the course of that process, any "0" digit is converted to a four bit representation of "10". Each digit is dialed out before the next digit is read into the dial counter. To that end, the automatic dialer available ADA signal is held at a low ("0") logic level while the automatic dialer off-hook AOH signal provided by the discrete output buffer 135 (FIG. 11) is alternately switched between a high ("1") and a low ("0") logic level, under program control, at a frequency and with a repetition rate selected to cause the DAA off-hook OH-DAA control signal (FIG. 12) to emulate a dialing pulse. As each dialing pulse is generated, the value of the digit being dialed is decremented by one, until the value reaches zero to confirm that the dialing of the digit has been completed. After a suitable delay, the process is repeated. As successive digits are transferred into the dial counter section of the RAM 108, a count stored within a dial location address of the RAM 108 is incremented by one, under program control, so that the last possible digit to be dialed out is marked by the dial location counter reaching a predetermined value, thereby allowing for a timely termination of the dial out routine.

For DTMF dialing, the four bit representations of the digits to be dialed are sequentially transferred to the TTROW1-TTROW4 and TTCOL1-TTCOL4 inputs of the tone generator 153 (FIG. 10) under program control. Two input/output instructions are utilized per digit, whereby the four bit representation of each digit is fed through the input/output device 114 to the TTROW1-TTROW1 inputs of the tone generator 153 in response to one instruction and to the TTCOL1-TTCOL4 inputs in response to another instruction. The tone generated by the tone generator 153 is fed through a normally open contact 154 of a relay 155 (FIG. 9) to the voice/data path DR-DAA provided by the DAA 39 (FIG. 12) which, in turn, applies it to the communications link. Again, the dial location counter provided by the RAM 108 is used to signal the completion of the dial out routine, and a suitable interval of time is maintained between the dialing of successive digits to avoid confusion. The tone generator 153 is, however, isolated from the transceiver 38 to avoid applying false data or control signals to the transceiver 38. To that end, the data path DR-TC for the transceiver 38 is coupled to the data path DR-DAA of the DAA 39 through a normally closed contact 156 of the relay 155.

Returning now to FIG. 17 to complete the description of the manual mode branch routine, it will be seen that the ROM 106 recycles to the dial out instruction 208 until the dialer hook switch HOOKSW signal at the input buffer 138 drops to a low ("0") logic level, thereby indicating that the dialer handset 35 is in place on its hook switch 34 as indicated at 209. A high ("0") logic level ARELAYN is then fed from the input/output device 113 (FIG. 12) to the coil 157 of the relay 155 (FIG. 10) to ensure that the data path DR-TC of the transceiver 38 is cut through to the voice/data path DR-DAA of the DAA 39, and a predetermined time out period starts to run. Specifically, a high ("1") logic level off-hook feedback OHFB signal must be detected at the discrete input buffer 137 before a high ("1") logic level TIMEOUT signal is detected at the other discrete input buffer 138 (FIG. 11). Otherwise, the ROM 106 will return to idle loop routine due to a failure of the transceiver 38 to start, as indicated at 211. If the transceiver 38 does start, the communication continues to a normal disconnect, as indicated at 207, unless a forced disconnect 208 is called for as a result of the transceiver 38 starting to scan an address card, as indicated at 206. Of course, when a normal or forced disconnect occurs, the ROM 106 returns to the idle loop routine.

As shown in FIGS. 10 and 11, programmed delay timing is performed by a programmable counter 161 which sets a flip-flop or latch 162 when a time out occurs, thereby causing the TIMEOUT signal provided by the latch 162 to go to a high ("1") logic level. When delay timing is called for, the counter 161 and the latch 162 are reset or cleared, under program control, in response to a reset signal TIMEOUT supplied by the input/output device 113 (FIG. 12). Further input/output instructions are then given to cause a single or multiple place binary count to be loaded into the counter 161 via outputs TBCD1-TBCD4 from the input/output device 114. That count is then decremented toward zero in response to clock pulses supplied by frequency divider 137, whereby a time out is signalled when the count reaches zero. Here, the basic frequency fo the decrementing clock pulses is approximately 3.1 KHz. However, there is a divide-by-eight stage (not shown) in the clock input of the counter 161 which is selectively bypassed if a control bit 8-BYPS supplied by the input/output device 113 is set, under program control, to a high ("1") logic level. Therefore, if the counter 161 has, say, the capacity to store a sixteen place binary count, any time out period from 320 microseconds to $2^{16} \times 320$ microseconds $\times$ 8 (to account for the divide-by-eight stage)—viz., 45 minutes-may be programmed into the counter 161.

Turning again to FIGS. 17 and 18, if an automatic start command is received, as indicated at 204, while the idle loop routine is being performed, the ROM 106 branches into an automatic dialing routine. A "START" button on the keyboard 36 may be depressed to generate an automatic start command or the actual or running time-of-day kept by an AM-PM clock 163 (FIG. 10) may come into coincidence with a delayed start time-of-day previously read into the RAM 108 through the use of the keyboard 36. For that reason, the keyboard 36 and the AM-PM clock 163 are periodically read while the idle loop routine is being performed, and the running time-of-day indication provided by the clock 163 is periodically compared against any delayed start time-of-day stored in the RAM 108. Any "START" button command and any delayed start time of day are read into the RAM 108 by the previously described keyboard reading process. Therefore, there is no reason to repeat that description. Instead, it suffices to note that the entry of a time-of-day for a delay start is initiated by depressing the "TIME SET" key on the keyboard 36. Thereafter, an appropriate one of the "AM" or "PM" keys is depressed, and then the digit keys are operated to identify the AM or PM hour and minute for the delayed start, starting with the digit for the most significant unit of time and proceeding in turn to the digit for the least significant unit of time. The four bit representations for the "AM" or "PM" key and the time identifying digit keys are stored in predetermined addresses within the active data storage section of the RAM 108 for display on the right-hand side of the display 96 and for comparison against the actual time-of-day kept by the AM-PM clock 163. Those bits are, however, transferred into a temporary storage section of the RAM 108 whenever the ROM 106 branches into the manual mode routine, a test routine (not shown) or a recall routine, or if an automatic start command is given.

As shown in FIG. 10, the AM-PM clock 163 fo this embodiment is a twelve hour clock which is driven by the ordinary 60 Hz line frequency. A normally open switch 102b is included so that the operator may set the clock 163 to the correct time by selectively applying a reference level voltage (say, ground) to a FASSET input for coarse adjustments or to a SLOSET input for fine adjustments. Suitably, the AM or PM significance of the running time-of-day is indiated by alternately setting and resetting the flip-flop 126 (FIG. 1) as the running time of-day rolls over from the last minute of the twelfth hour to the first minute of the first hour.

A self-contained strobe within the clock 163 provides a four bit strobe pattern on strobe leads HR10, HR1, MIN10 and MIN1 to identify the particular unit or place position of the running time-of-day which is currently represented by the four bit binary representation on digit leads CBCD1-CBCD8. Thus, to read the clock 163, appropriate input/output device 114, whereby the strobe leads HR10, HR1, MIN10 and MIN1 are read to obtain a four bit representation of the current value for that particular place position. The process is repeated, place position-by-place position, to obtain a full characterization of the existing time-of-day. The four bit representations of the existing values for those place positions are read into the active storage section of the RAM 108 for display on the left-hand side of the display 96, but are subject to being displaced therefrom if the ROM 106 branches into the manual mode routine, a test routine or a recall routine, or if an automatic start command is given.

If a delayed start time is loaded into the RAM 108, the actual time-of-day and the time-of-day selected for the delayed start are periodically compared under program control, to detect coincidence. To that end, the AM-PM indications, the more significant place values, and then the less significant place values for the actual and delayed start times are compared in order, until a lack of coincidence is found.

Returning to FIGS. 17 and 18, if the actual time-of-day coincides with the time-of-day selected for a delayed start, or if an immediate start command is entered by operating the "START" key, the ROM 106 branches into an automatic start routine under program control to determine whether the start command is to be executed or not as indicated at 212. If a dedicated recall memory section of the RAM 108 is full as indicated by, say, the flip-flop 127 being in a set state, if the transceiver 38 is off-hook as indicated by a high ("1") logic level off-hook OHFB signal at the input buffer 137, or if the input tray 42 of the automatic document feeder 41 (FIG. 2) is empty as indicated by a low ("0") logic level BTRAY signal at the input/output device 113, the ROM 106 exits from the automatic start routine and returns to the idle loop routine. Otherwise, the ROM 106 provides an instruction 213 which causes the transceiver 38 to feed and start to scan the first or bottommost document in the input tray 42 of the ADF 41 (FIG. 2). The BYSYNC signal applied to the input/output device 113 is monitored for a positive-to-negative transition which marks the completion of the first scanning cycle, and then the count representing a predetermined time out period is loaded under program control into the programmable counter 161 as previously described.

If the counter 161 times out before the distinctive bar code 84 (FIG. 5) along the borders of an address card is detected, the ROM 106 provides, as indicated 214, an instruction 215 which causes the document feeder 41 to eject the document and directs that appropriate entries be made in recall memory, as indicated at 216. The absence of the bar code 84 indicates that the document was not an address card or a pause card. If there is another document in the input tray 42 as indicated by a high ("1") logic level BTRAY signal at the input/output device 113, the ROM 106 returns to the feed and scan instruction 213. If not, the ROM 106 returns to the idle loop routine, as indicated at 217.

If the bar code 84 is detected, another predetermined count is loaded into the counter 161 under program control to provide a fixed time-out period for detecting the bar code 87 marking the first row of the address card instruction field 85. Should a time out occur, the ROM 106 provides the eject instruction 215 and the recall entry instruction 216 and then looks for another document in the ADF tray 42, as indicated at 217, on the assumption that the address card is misoriented.

When a border bar code 84 and a row bar code 87 are detected on time, the ROM 106 provides instructions 217 to (1) read the mark sense identified terminal and dialing control instruction in the instruction field 85 of the address card into the active data section of the RAM 108 for display on the display 96; provide the transceiver 38 with the appropriate input control signals for executing the terminal control instructions; load a preselected count into a predetermined redial counter address within the RAM 108; and cause the document feeder 41 to eject the address card after the last instruction has been read.

As previously mentioned, the mark sense identified terminal and dialing control instructions are decoded by utilizing the bar code 87 preceding each row of the instruction field 85 as a timing reference. That process yields a four bit representation for each mark sense identified instruction that is scanned, unless two or more mark sense identified instructions are encountered during the scanning of any given row. If that occurs, blanks are loaded into the RAM address for the instruction from that row under program control. To that end, the flip-flop 126 (FIG. 11) is reset in response to the detection of each bar code 87 and set in response to the detection of each mark sense identified instruction, and blanks are loaded into the RAM address for any given row if a mark sense identified instruction is detected while the flip-flop 126 is in a set state.

Each time a row bar code 87 is detected while the flip-flop 126 is in a set state, a predetermined count is loaded into the counter 121 to obtain a high ("1") logic level TIMOUT signal at the discrete input buffer 137 whenever two rows or an equivalent segment of the address card is scanned without detecting a mark sense identified instruction. That, in turn, causes the ROM 106 to issue an instruction for ejecting the address card from the ADF 41 and to initiate a dial-out routine as indicated at 219.

The decoded dialing and terminal control instructions are stored in the active data section of the RAM 108 for display on the display 96. Pulse or DTMF dialing is performed in response to these instructions in the manner described above, except that initial and intermediate dial tones are accommodated by pausing for a predetermined period of time, if blind dialing has been selected, or by waiting until dial tone is detected, if dial tone response dialing has been selected. A switch 102c is manually positioned by the operator to apply a high ("1") or a low ("0") logic level signal to an input of the discrete input buffer 138 (FIG. 11), thereby reflecting the option which has been selected.

For blind dialing, a predetermined count is loaded into the programmable counter 161 (FIG. 10) whenever the four bit representation of an initial or intermediate dial tone is read out of the RAM 108 during the dial-out routine. That routine is then suspended for a predetermined amount of time, until a high ("1") logic level TIMOUT signal is received at the input buffer 137 (FIG. 11) to indicate that the time allotted to the acquisition of dial tone has expired.

When dial tone responsive dialing is selected, a predetermined time out period is allotted to the acquisition of any initial or intermediate dial tone, but the dial-out routine does not resume until there is a high ("1") logic level busy back/dial tone signal BUSYDT at the input/output device 114 (FIG. 10) to confirm that dial tone has been received. If a time out occurs before dial tone is received, the ROM 106 suitably advances under program control to the redial subroutine described hereinbelow.

Figure 9:
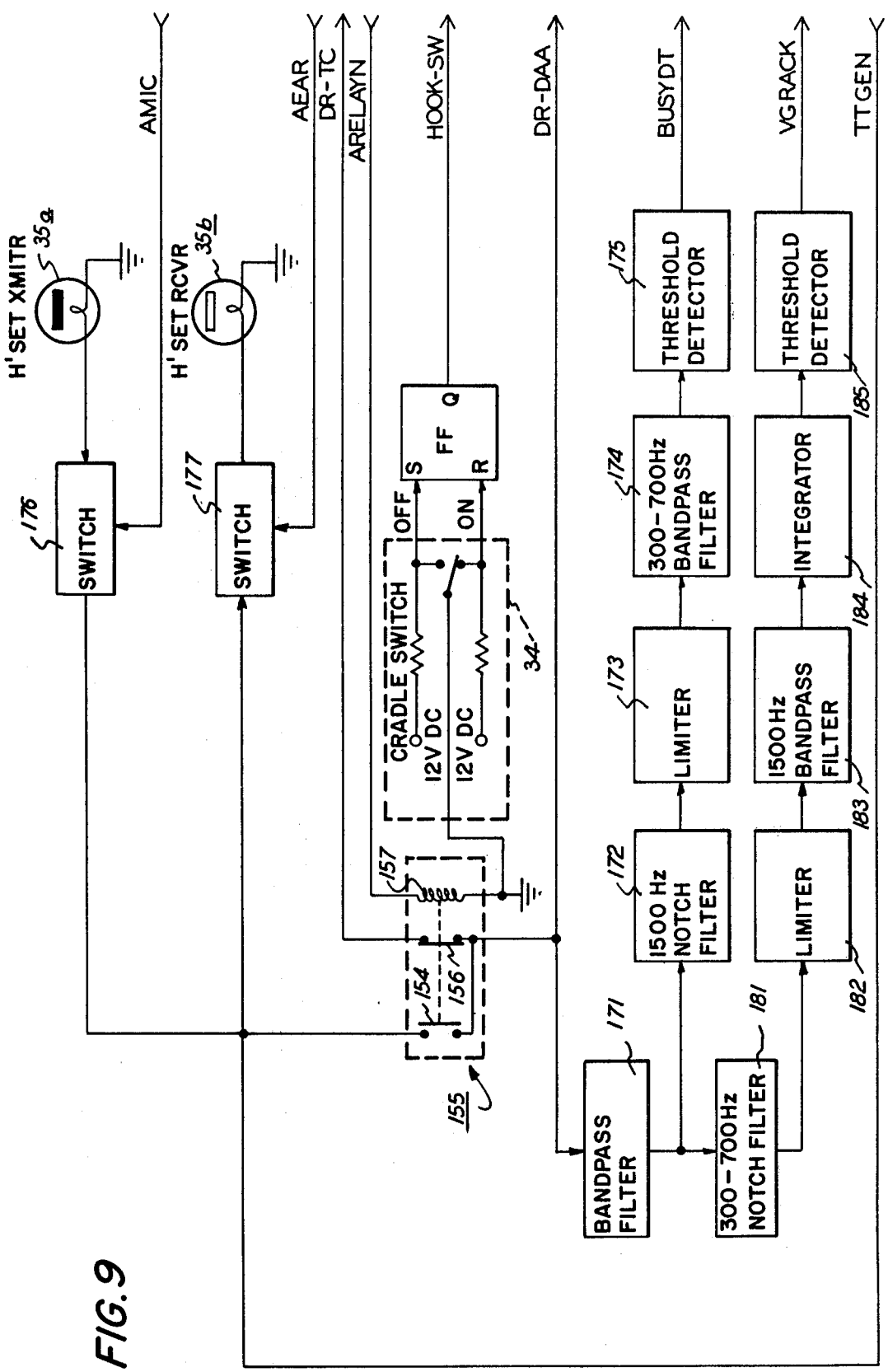
FIGS. 9–16 are intended to be assembled.

As shown in FIG. 9, to perform the busy back/dial tone detection function, this embodiment includes a bandpass filter 171, which has a passband roughly equal to the passband of an ordinary voice grade telephone channel, for coupling the data/voice path DR-DAA of the DAA 39 (FIG. 12) to a series detector circuit comprising a 1500 Hz notch filter 172, a limiter 173, a 300 Hz – 700 Hz bandpass filter 174 and a threshold detector 175. Much of the extraneous noise outside the 300 Hz to 700 Hz range normally used for dial tone and busy back signalling is eliminated by the bandpass filters 171 and 174, but the notch filter 172 provides an additional measure of protection against a false BUSYDT indication by sharply attenuating any energy at the 1500 Hz frequency used for handshaking purposes. Even with that protection, there may be circumstances where sufficient energy applied to the threshold detector 175 to cause it to generate a high ("1") logic level BUSYDT signal in the absence of a busy back or dial tone signal, but that situation is straight forwardly dealt with by validating the BUSYDT signal only if it remains at that logic level for a suitably long period of time. Of course, the limiter 173 protects the bandpass filter 175 and the threshold detector 176 against the potentially damaging effects of excessively high signal levels.

When dialing is completed, the ROM 106 provides instructions 211 which cause the tone generator 153 (FIG. 10) to feed an appropriate handshaking signal through the DAA 39 in an attempt to establish communications with the remote terminal being called. Specifically, for the Xerox 200 Telecopier transceiver compatible case, the tone generator 153 is instructed to supply a combination of 1200 Hz tones or an alternating 1800/1500 Hz tone, depending on whether the transceiver 38 is to operate in a transmit mode or a receive mode as determined by the terminal control instructions stored in the RAM 108. During the dialing an initial handshaking, a low ("0") logic level ARELAYN signal is generated under program control so that the tone generator 153 is cut through to the voice/data path DR-DAA of the DAA 39. At the same time, high ("1") logic level AMIC and AEAR signals are provided to open circuit switches 176 and 177 which are connected in series with the transmitter 35a and receiver 35b sections of the handset 35.

Another count is loaded into the counter 161 when dialing is completed to provide the remote terminal with a predetermined amount of time to respond to the handshaking signal supplied by the tone generator 153. During this period, the input/output device 114 (FIG. 10) is sampled for a high ("1") logic level busy back/tone detect signal BUSYDT, as indicated at 222, and for a high ("1") logic level acknowledgment signal VGRACK, as indicated at 223. Additionally, the input buffer 137 (FIG. 11) is sampled for a high ("1") logic level time out signal TIMOUT. If an acknowledgment is detected, the ROM 106 provides the necessary instructions for cutting the transceiver 38 through to the voice/data path DR-DAA of the DAA 39 and for otherwise preparing it for operation, as indicated at 224-230. If, on the other hand, a busy link condition is detected, the ROM 106 initiates a redial subroutine, as indicated at 241-243. Or, if a time out occurs without detecting a busy back signal or an acknowledgment signal, the ROM 106 aborts the job with an appropriate recall entry instruction 216.

In keeping with the customary handshaking protocol of a Xerox 200 Telecopier transceiver, the remote terminal is expected to generate an intermittent 1500 Hz acknowledgment or ready signal in response to either of the handshaking signals which can be provided by the tone generator 153. Thus, to provide for the detection of such an acknowledgment signal, the voice/data path DR-DAA of the DAA 39 is coupled through the bandpass filter 171 to another series detector circuit which, as shown in FIG. 9, comprises a 300 Hz – 700 Hz notch filter 181, a protective limiter 182, a 1500 Hz bandpass filter 183, an integrator 184 and a threshold detector 185. Accordingly, a high ("1") logic level acknowledgment signal VGRACK is supplied by the threshold detector 185 only if there is a substantial amount of persistent energy at or about the 1500 Hz center frequency of the bandpass filter 183. Transients are in large part ignored because of the time constant associated with the integrator 184. Additionally, the threshold detector 185 advantageously includes a voice guard circuit (not shown) to prevent 1500 Hz energy accompanied by significant amounts of energy at other voice band frequencies from being misinterpeted as an acknowledgment signal. Nevertheless, the preferred practice is to require that the VGRACK signal remain at the high ("1") logic level for a predetermined period of time before being accepted as a valid indication that an acknowledgment has been received.

If a valid high ("1") logic level acknowledgment detect signal VGRACK is received before the post-dialing time out period expires, a determination is made, as indicated at 224, whether the terminal control instructions which were given call for the transceiver 38 to operate in a transmit mode or a receive mode. If the transceiver 38 is being operated in the receive mode, the off-hook OHFB signal at the input buffer 137 is repeatedly sampled, under program control, to detect the disconnect 225 which occurs when the communication is completed. At that point, the ROM 106 is returned to the starting point for the automatic mode branch routine to determine, as indicated at 212, whether another automatic start may be carried out.

In the event that the inquiry 224 leads to the conclusion that the transceiver 38 is being instructed to operate in a transmit mode, the ROM 106 responds by providing an instruction 226 to feed and scan the next document. As the lead edge of that document is being scanned, the BSVID signal appearing at the input/output device 112 (FIG. 4) is sampled to determine, as indicated at 227, whether an address card or a pause card is being scanned. If so, the ROM 106 provides a forced disconnect instruction 228 to disconnect the call and to terminate the feed and scan.

Returning for a moment to FIG. 5B, it will be seen that a pause card 88 has a distinctive border bar code 89 along the leading and trailing edges of its front and rear sides. The characterizing feature of the pause card bar code 89 is that it contains the address card border bar code 84 in addition to a distinguishing code segment 90. Moreover, unlike the address cards 81a–81c (FIG. 5A), the pause card 89 is symmetrical and, therefore, does not impose a critical orientation requirement.

Turning back to FIGS. 17 and 18, when the transceiver 38 is operating in its transmit mode, the ROM 106 repeats the feed and scan next document instruction 226 as necessary to allow for the transmission of the information content of successive subject copies destined to the same remote terminal. Each of those documents is examined to determine whether a forced disconnect instruction 228 should be given because an address card or a pause card is being scanned. Furthermore, the off-hook feedback OHFB signal is sampled to determine, as indicated at 229, whether a normal disconnect has occurred.

When a forced disconnect instruction 228 is given, a determination is made, as indicated at 231, whether the scanning of the distinctive border bar code 90 (FIG. 5) of a pause card was responsible for that instruction being given. If so, a predetermined count is loaded into the programmable counter 161, under program control, to suspend the automatic mode of operation of the automatic dialer 31 for a predetermined period of time as indicated at 232. If not, or if a normal (non-program initiated) disconnect was detected, the ROM 106 immediately returns to the starting point of the automatic mode branch routine to determine, as indicated at 212, whether another automatic start is permissible.

As will be recalled, the programmable counter 161 (FIG. 10) for the particular time-out embodiment has the capacity to provide a time-out period of up to 45 minutes. Suitably, the delay 231 allotted to each pause card is selected to equal a predetermined fractional portion of that period, such as one half or, in other words, 22.5 minutes. That provides ample time for the transceiver 38 to accommodate a few incoming calls or for an operator to use the automatic dialer 31 in its manual mode to place a few outgoing calls. Moreover, if additional time is needed, two pause cards may be stacked one after another in the input tray 42 to take advantage of the full capacity of the counter 161. It should be noted that when an automatic start command is given, the ROM 106 provides appropriate instructions (not shown) for initializing the transceiver 38 in its test mode to scan at its two-minute document transmission rate, and that the transceiver 38 remains in that mode until contrary instructions are provided as a result of scanning an address card with mark sense indicia identifying terminal control instructions or as a result of starting to scan a document which does not have the distinctive address card border bar code 84.

When the pause card initiated delay period expires, as indicated by the appearance of a high ("1") logic level TIMOUT signal at the input buffer 137 (FIG. 11), the BTRAY signal applied to the input/output device 112 is sampled to determine, as indicated at 217, whether the ADF tray 42 (FIG. 2) is now empty or not. If so, the ROM 106 returns to the starting point 212 for the idle loop routine. If not, the ROM 106 provides another feed and scan instruction 213 to re-initiate the automatic mode of operation of the dialer 31.

In passing, it is worth mentioning that each pause card 90 should be preceded by and followed by another pause card or by an address card, as shown in FIG. 4. A flag 233 is set after an initial correctly marked and oriented address card is scanned to allow the transceiver 38 to scan pause cards, despite the negative result of the address card correct inquiry 214, as indicated at 234. That inquiry 214 does, however, lead to a job abort with an appropriate recall entry 216, if a pause card is not preceded by and followed by another pause card or an address card.

Focusing now on the redial subroutine, it will be seen that if a high ("1") logic level busy back/dial tone detect signal BUSYDT is applied to the input/output device 114 (FIG. 10) during the post-dial out time out period, an inquiry 241 is made, under program control, to determine whether the redial count stored in the RAM 108 is equal to zero. If that count has not yet reached zero, the ROM 106 issues a delay instruction 242 and an instruction 243 to decrement the redial counter by one before returning to the dial-out instruction 219 for the purpose of making another attempt at placing the call in accordance with the dialing instructions in the active data section of the RAM 108. If a busy link is repeatedly encountered, the redial count ultimately reaches zero. When that occurs, the ROM 106 exits from the redial subroutine with an instruction 216 to make an appropriate entry into the recall memory section of the ROM 108. That and the other recall memory instructions which have been referred to hereinabove are described in further detail in a commonly assigned and concurrently filed United States patent application of R. Heckman and J. Torpie for "Automatic Dialer Having a Recall Memory".

Desirably, there is a manually operable switch 102d for applying a high ("1") or a low ("0") logic level control signal to the discrete input buffer 138 so that a long or short redial delay period may be selected by the operator. That option is easily accommodated by simply altering the count that is loaded into the programmable counter 161 when executing the delay instruction 242 to reflect the setting of the switch 102d.

CONCLUSION

In view of the foregoing, it will now be understood that an automatic telephone dialer which is particularly well suited for use with facsimile terminals and the like has been provided.

What is claimed is:

1. In an automatic telephone dialer for placing an outgoing telephone call from a terminal having a raster input scanner in accordance with dialing instructions identified by mark sense indicia carried in a two dimensional field by an address card scanned by said scanner, the improvement comprising means for detecting a busy back signal, means responsive to the detection of said signal for automatically attempting to replace said call after a predetermined delay, and means for at least temporally suspending further operation of said scanner pending successful placement of said call.

2. The improvement of claim 1 including means for manually selecting a long or a short delay to separate successive attempts at placing said call.

3. The improvement of claim 1 further including means for counting attempts at placing said call, and means for terminating such attempts when a predetermined count is reached.

4. The improvement of claim 3 wherein said terminal is a facsimile terminal, said address card further contains mark sense indicia identifying control instructions for said terminal, and said dialer includes means for controlling said facsimile terminal in accordance with said terminal control instructions.

5. The improvement of claim 4 wherein said raster input scanner is further utilized whenever said facsimile terminal is operating in a transmit mode to serially convert graphic information carried by a subject copy into a corresponding video signal for transmission to another terminal.

* * * * *